United States Patent
Shirai et al.

[15] 3,640,152
[45] Feb. 8, 1972

[54] CONTROL FOR AUTOMATIC TRANSMISSION

[72] Inventors: Takeaki Shirai, Nagoya-shi; Shigeru Sakakibara, Chita-gun, Aichi-ken; Masaaki Noguchi, Nagoya-shi; Masaharu Sumiyoshi, Toyota-shi, all of Japan

[73] Assignees: Toyota Jidosha Kogyo Kabushiki Kaisha; Nippon Denso Kabushiki Kaisha

[22] Filed: Sept. 5, 1969

[21] Appl. No.: 855,510

[30] Foreign Application Priority Data

Oct. 18, 1968 Japan.................................43/76293

[52] U.S. Cl.............................................................74/752
[51] Int. Cl.........................................................F16h 5/42
[58] Field of Search .................................74/752 A, 866

[56] References Cited

UNITED STATES PATENTS

| | | | |
|---|---|---|---|
| 3,354,744 | 11/1967 | Kuhnle et al. | 74/752 A |
| 3,439,564 | 4/1969 | Scholl et al. | 74/752 A |
| 3,448,640 | 6/1969 | Nelson | 74/752 A |

*Primary Examiner*—C. J. Husar
*Attorney*—Blum, Moscovitz, Friedman & Kaplan

[57] ABSTRACT

The present invention relates to a control for automatic transmission of a vehicle wherein the computation of the slip ratio may be established by any one of, mechanical means, means utilizing fluid under pressure, or electrical means; there being associated in combination therewith, a computing circuit which is applied for the determination of the number of revolutions of the engine of the vehicle, the number of revolutions of the output shaft of the torque converter or the power driven shaft of the drive unit of the vehicle, and there being additionally applied in connection therewith a logic product circuit, a logic sum circuit, a bistable memorial circuit and a synchronous time retaining circuit for effectuating the operation of electrically actuable distribution valve means to control the transition from high- to low-gear functions and vice versa for the vehicle.

5 Claims, 46 Drawing Figures

FIG. I.

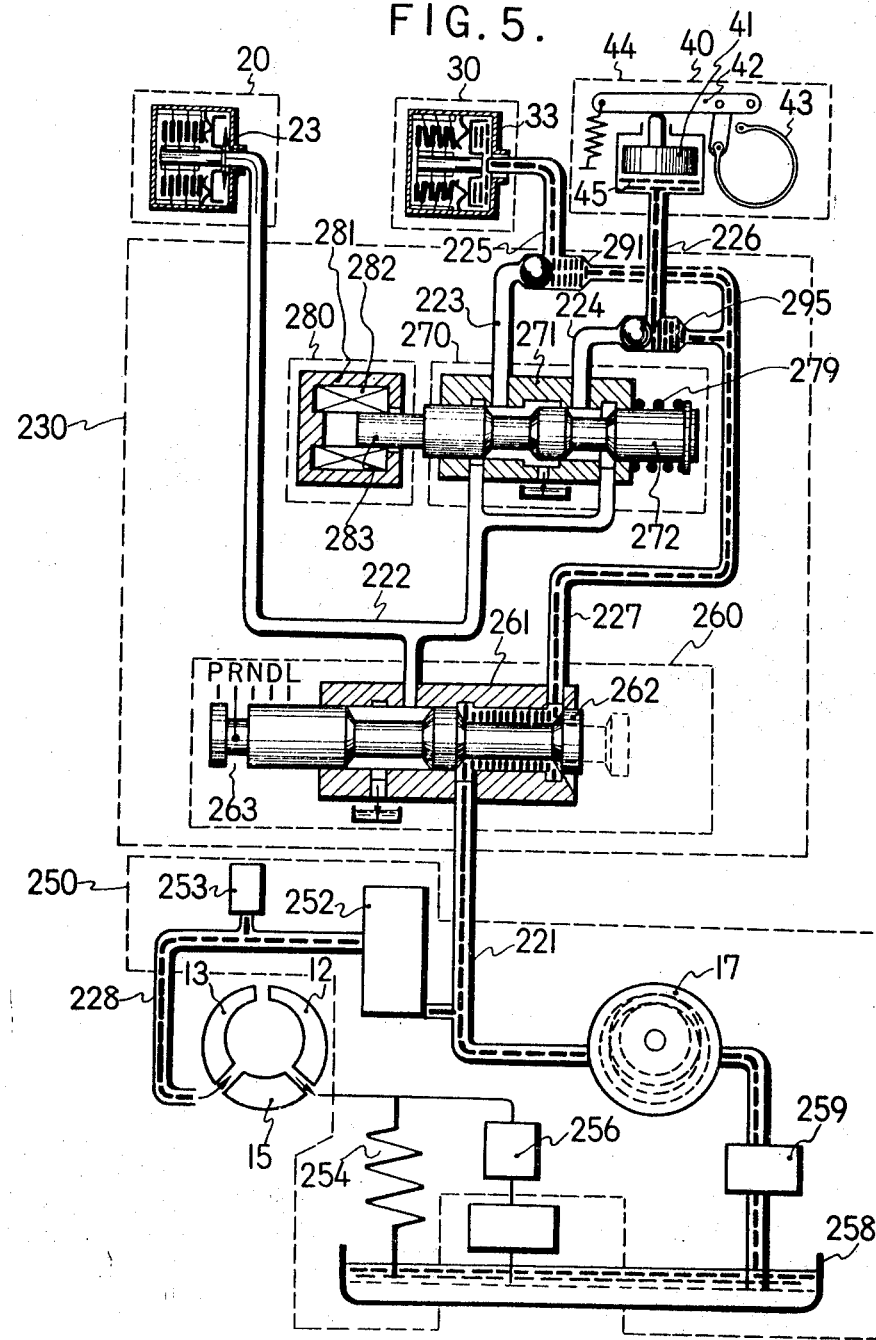

FIG. 9.
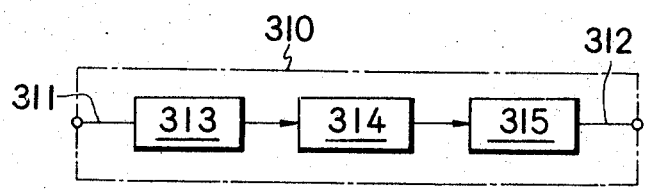
FIG. 10.
WAVE INPUT VOLTAGE (a)
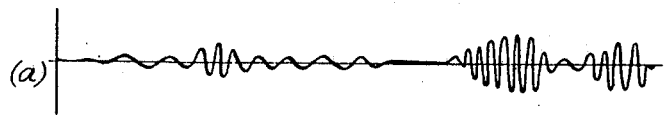
OUTPUT WAVE OF THE AMPLITUDE LIMITING CIRCUIT (b)
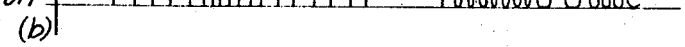
WAVE OUTPUT VOLTAGE (c)
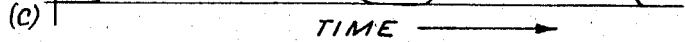
TIME →

CONTROL FOR AUTOMATIC TRANSMISSION

SUMMARY OF THE INVENTION

A variable speed transmission is provided for a vehicle having an engine, a gear unit providing a plurality of different speed gear ratio drives, a hydraulic torque converter interposed therebetween and friction-engaging means including fluid-actuated motors which effectuate the respective gear ratio drives; and in combination therewith, there is provided a source of fluid under pressure, fluid delivery conduit means for connecting said source of fluid under pressure with said motors, and including a manual selecting valve for supplying the fluid under pressure to certain of said conduits, and one or more electrically operable distribution valves for selectively supplying fluid under pressure to certain motors, means for operating the respective distribution valves, means for generating an electric signal when the revolving velocity of said engine has attained at a predetermined limiting value, means for generating electric signals when the ratio of the revolving velocity of the output shaft of said engine to the revolving velocity of the power-driven shaft of said gear unit has attained a predetermined limiting value, means for generating electric signals when the running speed of the vehicle has attained a predetermined limiting value, means for generating an electric signal for indicating the position of the selected gear ratio drive of said gear unit; and means for operating the respective distribution valves in one direction, comprising a synchronous time-retaining circuit for generating an electric signal when a predetermined time has passed after the operation of the selected one of said distribution valves and a logic product circuit for generating an output electric signal when all the aforesaid electric signals are coexistent, and means operable by applying the output electric signal generated by said logic product circuit for moving said distribution valve or valves in one direction by activating the electrically operable means; and means for activating the logic sum circuit for generating output electric signal when one, of the electric signals of the running speed of the vehicle or the electric signal of said revolving velocity ratio of the output shaft of the engine or the output shaft of the gear drive unit and the electric signal of the revolving velocity of said engine shaft is present, and means are provided for moving said distribution valve in the other direction, by generating output electric signal, when the output electric signal of said logic sum circuit, the output electric signal of the position of said gear ratio drives, and the electric signal of said synchronous time-retaining circuit are coexistent.

DETAILED DESCRIPTION OF THE INVENTION

The present invention is characterized in that the slip rate of hydraulic torque converter is utilized as the main factor for determining the speed change point, and at the same time, a calculating function through the medium of an electronic circuit is introduced to dispatch the most appropriate speed change instructions in respect of the particular speed change conditions; and the frictional engaging means of the transmission is then operated through the oil pressure operation circuit to effectuate the desired speed change.

The main object of the present invention resides in that, in an automatic transmission the fluid pressure of fluid pressure source for actuating the friction-engaging means for completing the selected gear ratio drives of the gear unit having a plurality of different speed gear ratio drives is used and the distribution valve operated electrically operable means and the manual selecting valve are utilized for controlling the actuation of the fluid pressure.

Another object of the present invention resides in that the electric signal for operating the electrically operable means for operating said distribution valve is generated by the combination of electric signal generated when the revolving velocity of the output shaft of the engine has arrived at a predetermined limiting value, the electric signal generated when the revolving velocity of the power-driven shaft of the gear unit has arrived at a predetermined limiting value, the electric signal generated when the cruising speed of the vehicle has arrived at a predetermined limiting value, the electric signal generated when the revolving velocity of said output shaft of the engine and said power-driven shaft of the gear unit have arrived at a predetermined limiting value, and the signal has been generated for indicating the gear position of the gear ratio drives of said gear unit.

A further object of the present invention resides in that when the gear unit is at the lower speed gear position and all said electric signals are present, electric signal to move the gear unit to higher speed gear position is generated to effect the operation of the distribution valves, so that the friction engagement for higher speed gear position is completed, and when the gear unit is at the higher speed gear position and any one of the aforesaid electric signals is present, the electric signal to move the gear unit to lower speed gear position is generated to effect the operation of the respective distribution valves so that the friction engagement for lower speed gear position is completed.

Still further object of the present invention resides in that the bistable memorial circuit is used, wherein the respective input signals thereof are electric signals to move the gear position of said gear unit from lower speed gear position to higher speed gear position and vice versa, and when either of said electric signals comes into said bistable memorial circuit as an input signal, said bistable memorial circuit generates an electric signal to operate the distribution valve in one direction, remembers it and becomes stable for such operation, and when the other of said electric signals comes into said bistable memorial circuit as a new input signal, said bistable memorial circuit generates an electric signal to operate the distribution valve and in the reverse direction, remembers it and becomes stable for such operation.

Still a further object of the present invention resides in that when either of said electric signals to move the gear position from lower speed gear position to higher speed gear position and vice versa is fed to the synchronous time-retaining circuit as an input signal, said synchronous time-retaining circuit generates an electric signal for a time-delaying operation as an output signal to prevent the generation of a second electric signal for moving the gear position when the first electric signal has been generated.

Other objects and advantages of the present invention will be made more apparent as this description proceeds, particularly when considered in connection with the accompanying drawings, in which:

FIG. 1 is a cross-sectional view of an embodiment of the automatic transmission of the present invention;

FIGS. 2, 3, 4, and 5 are the diagrams showing the operations of oil pressure operation circuit of an embodiment of forward two-speed-type transmission mechanism, illustrates conditions for respectively the N, DL, DH, and R states;

FIG. 9 is a block diagram showing the structure of the r.p.m. computing circuit thereof;

FIG. 10 is a diagram showing the operation voltage wave of the r.p.m. computing circuit thereof;

Figure 40:
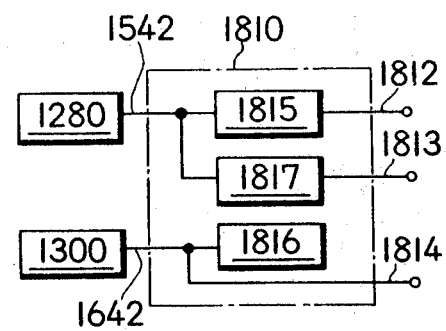
Figure 26A:
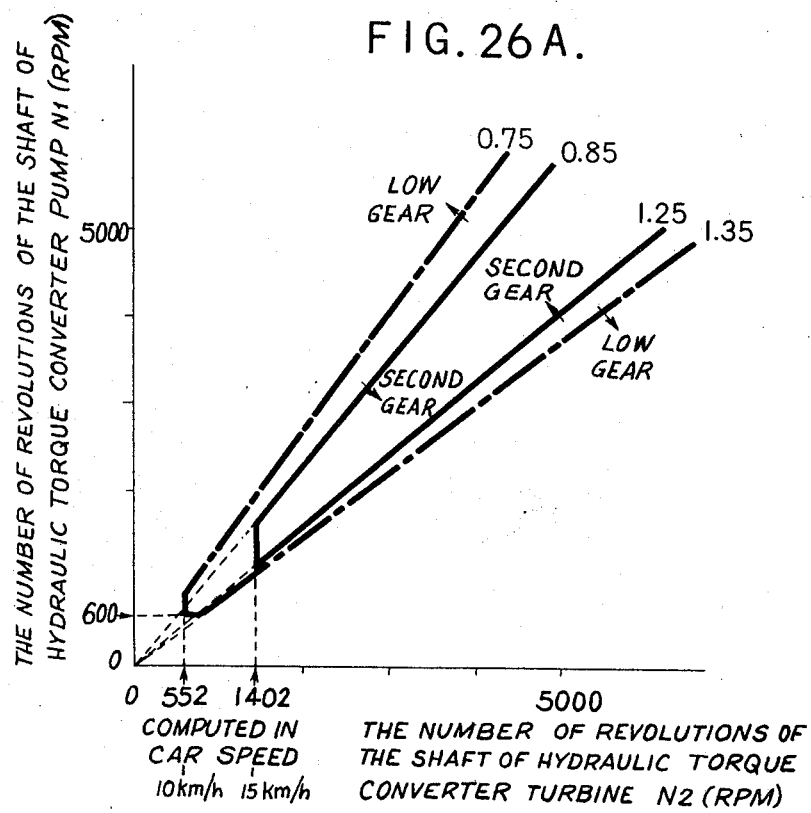
Figure 27:
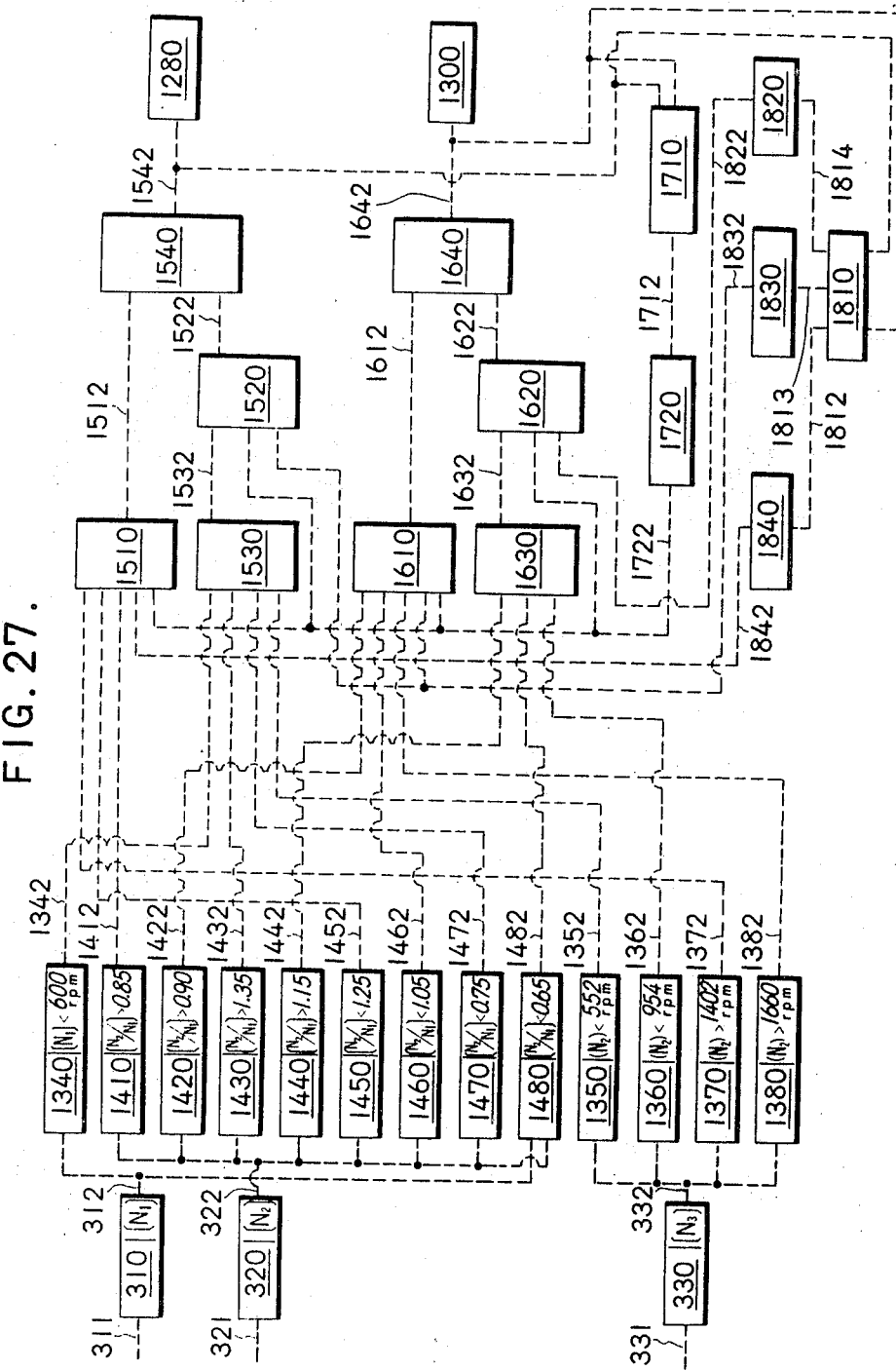
Figure 28:
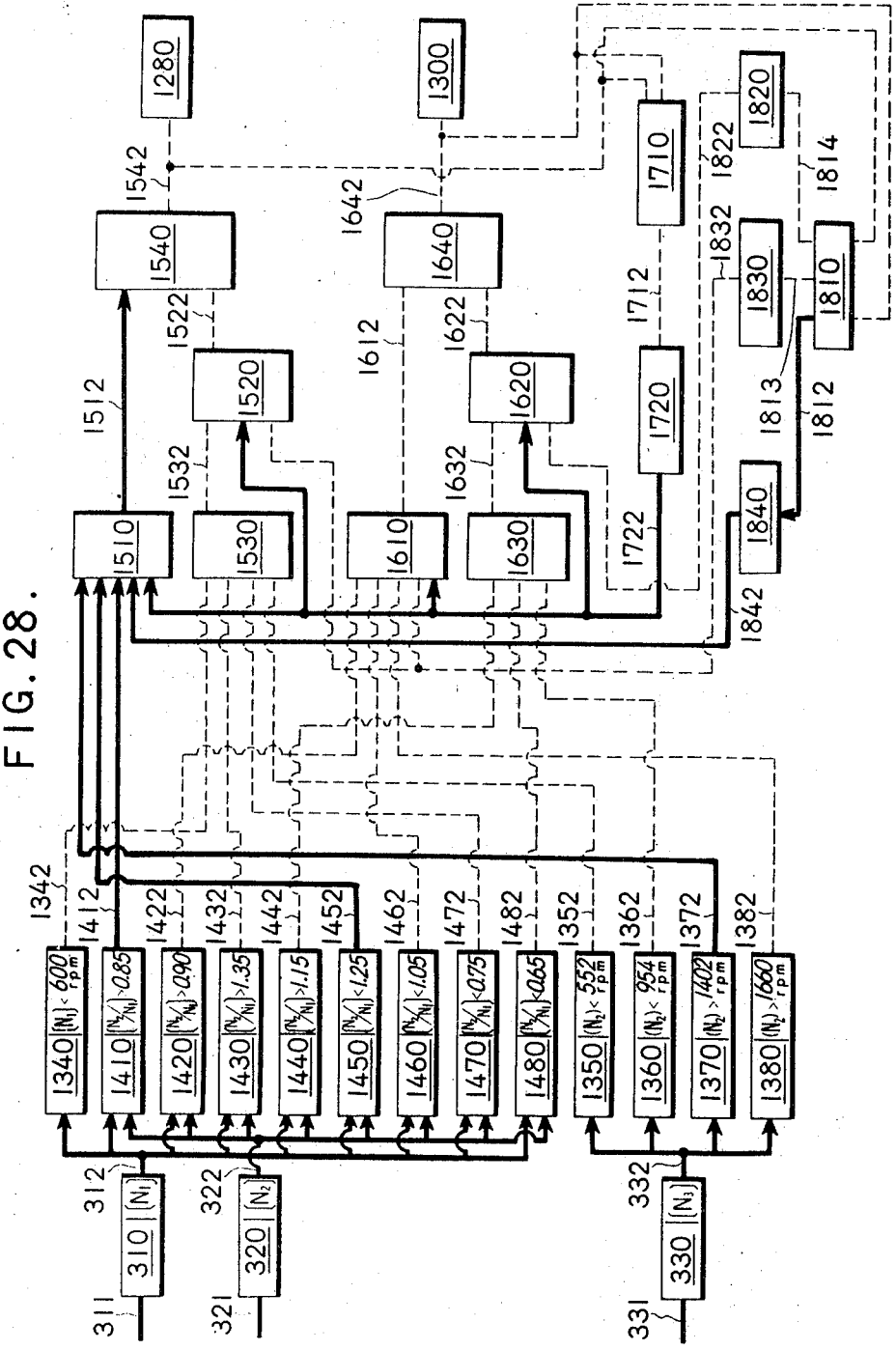
Figure 29:
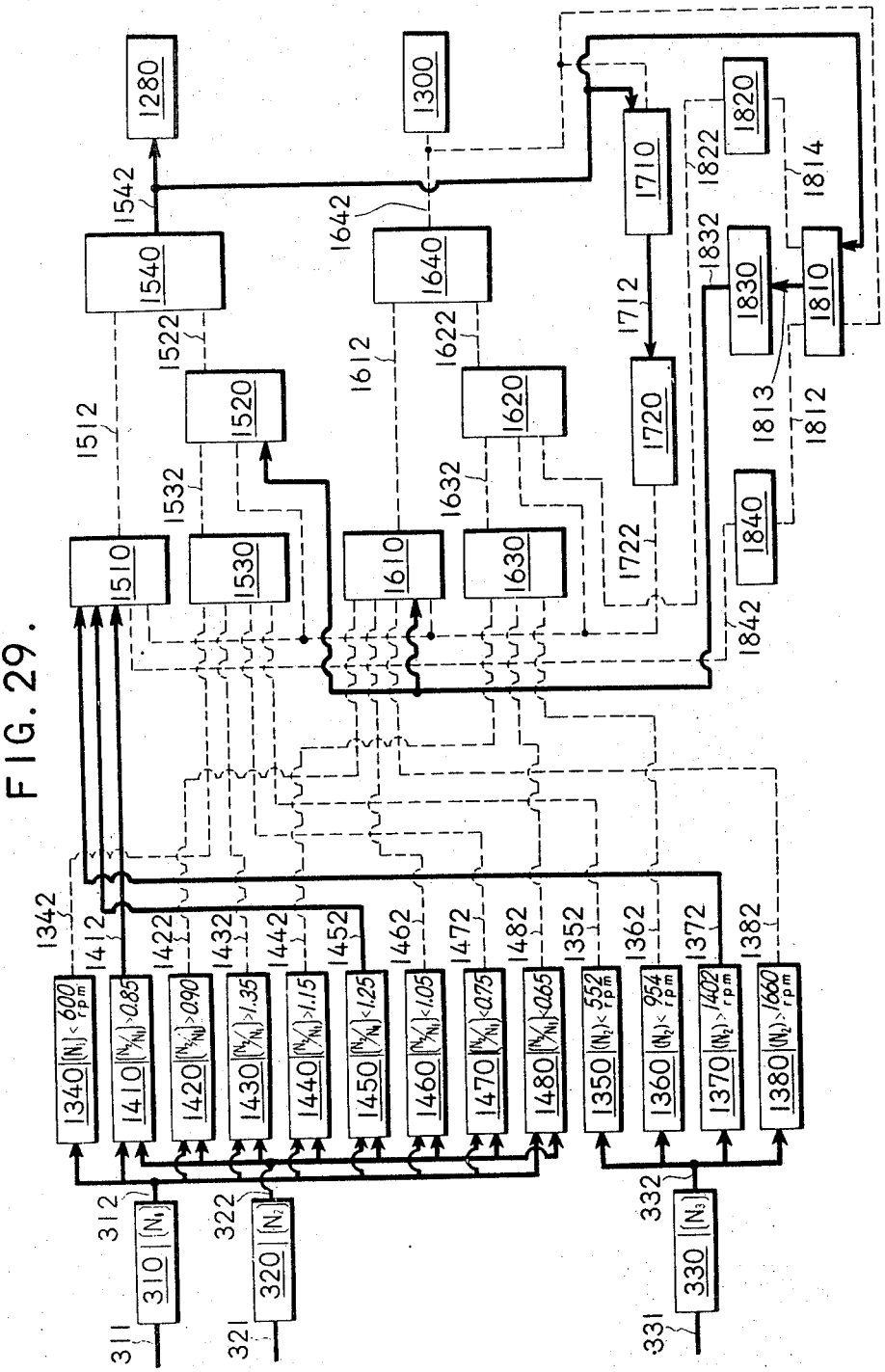
Figure 30:
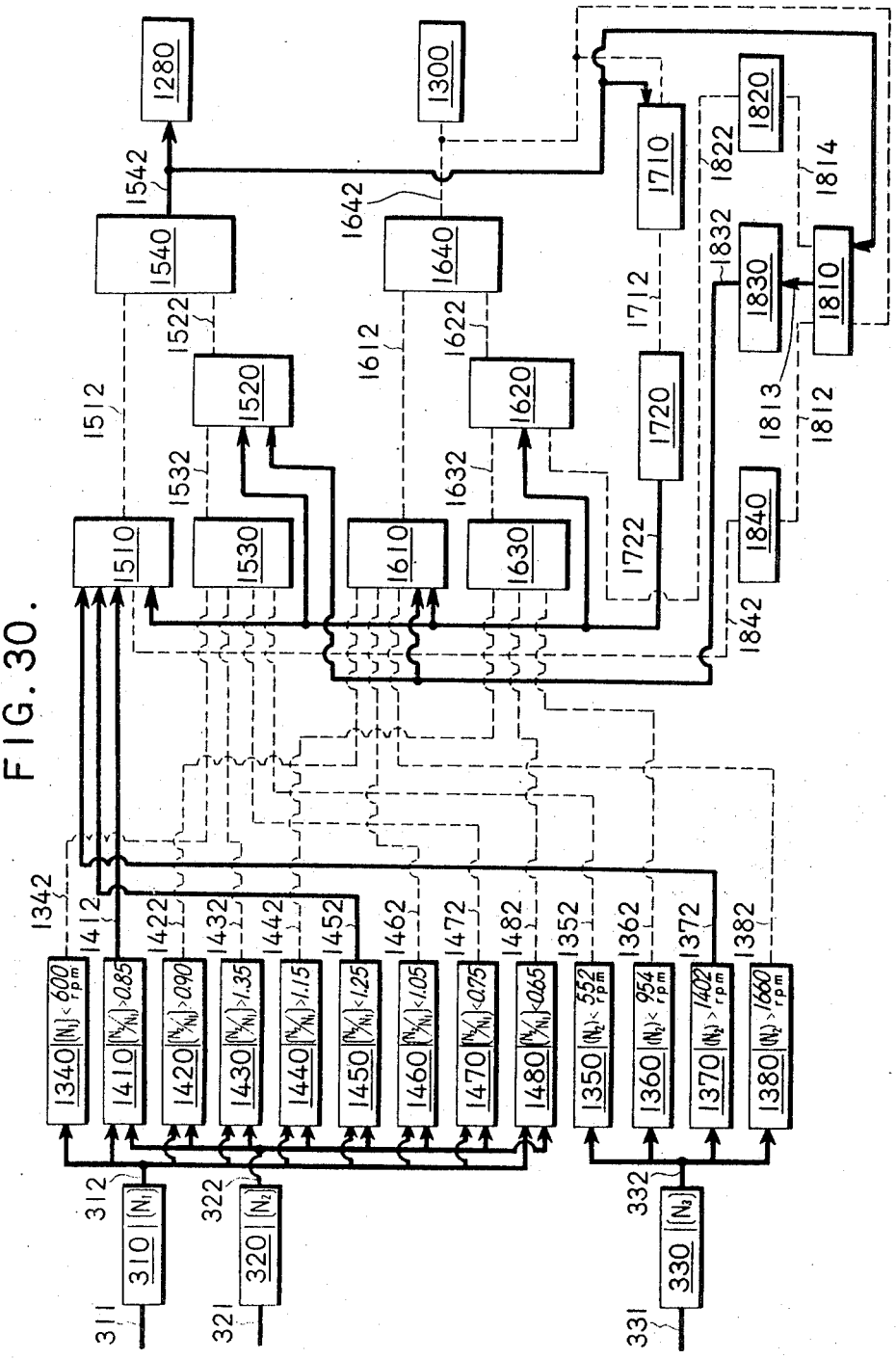
Figure 31:
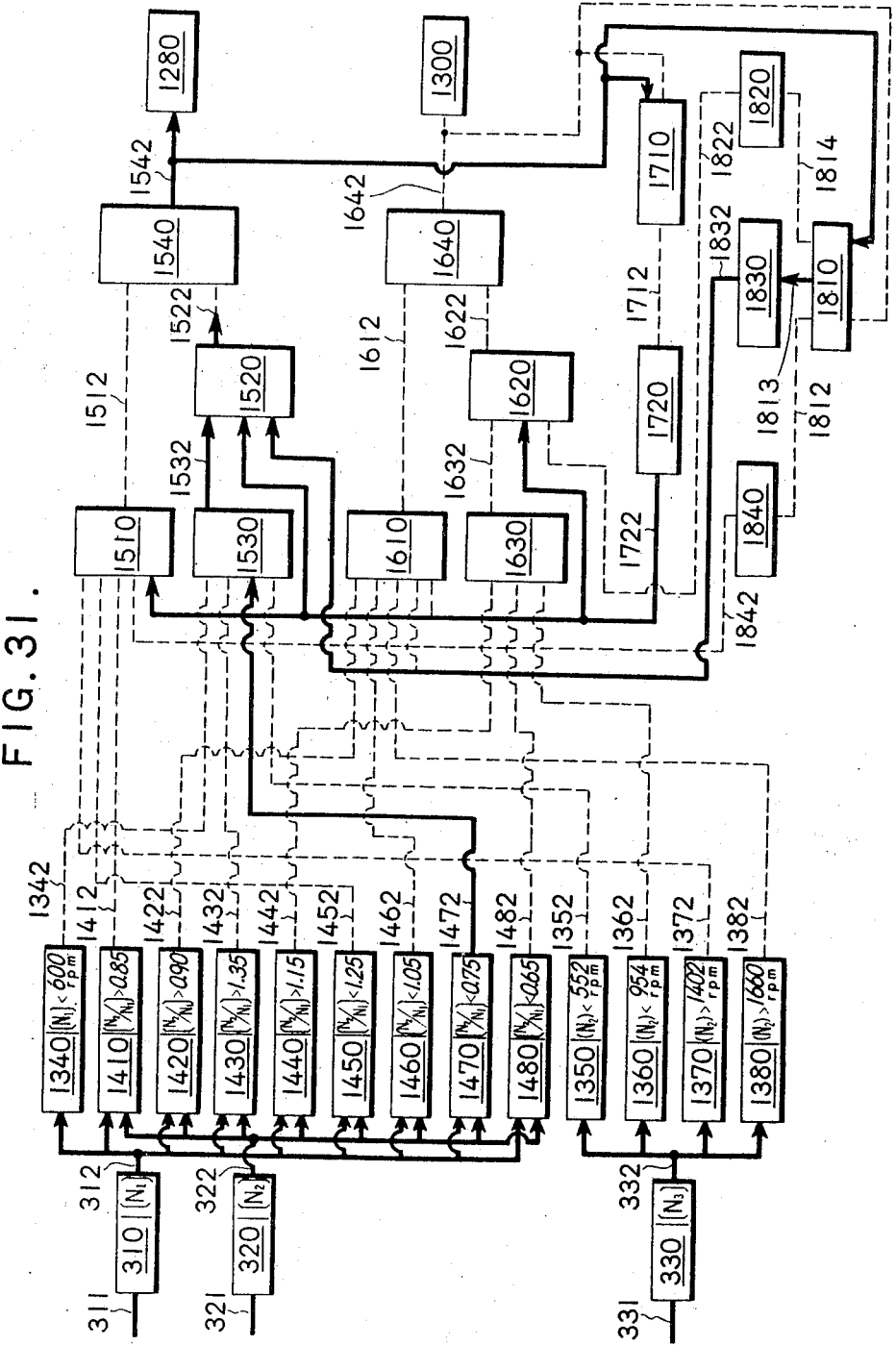
Figure 32:
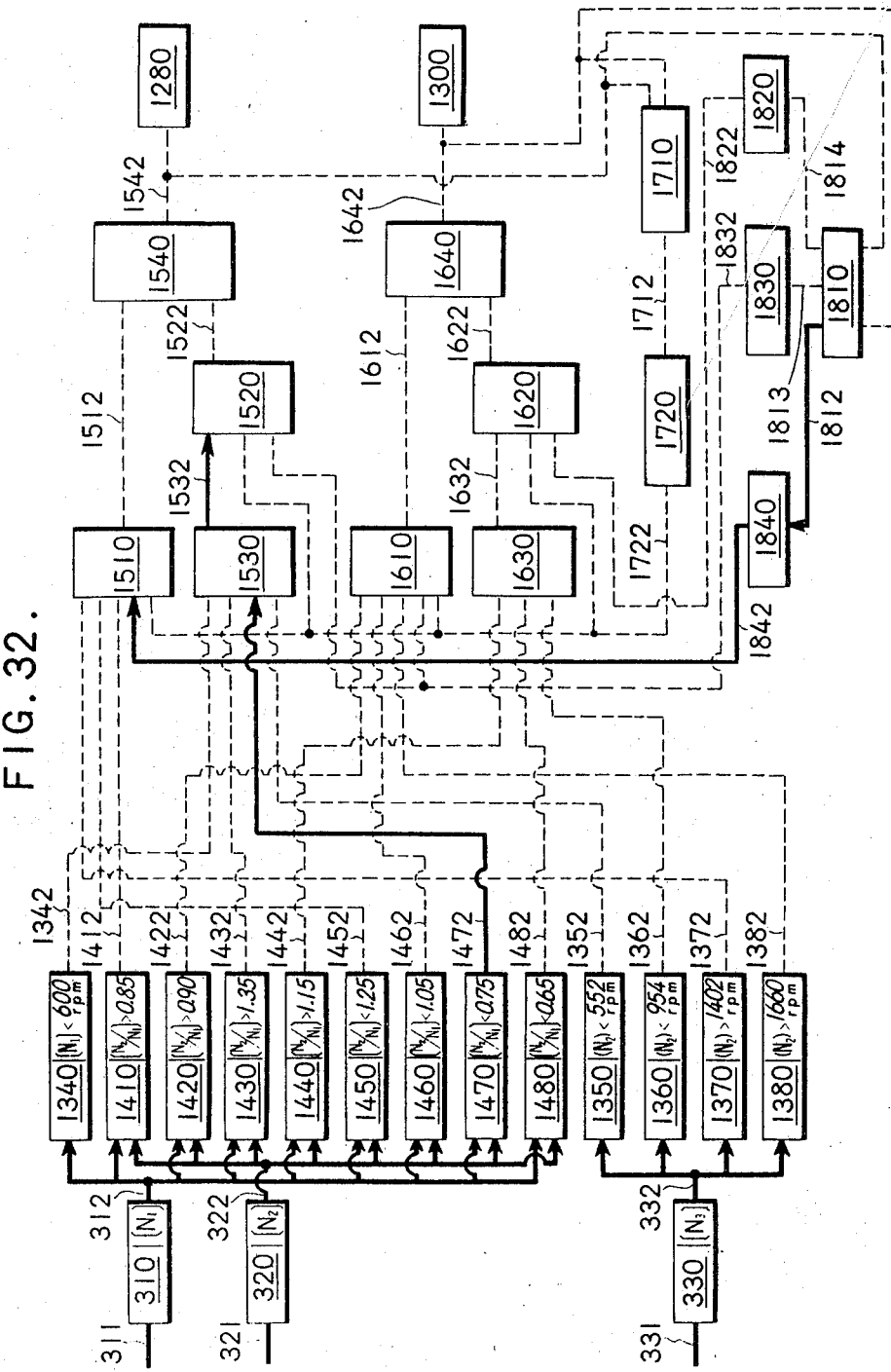
Figure 33:
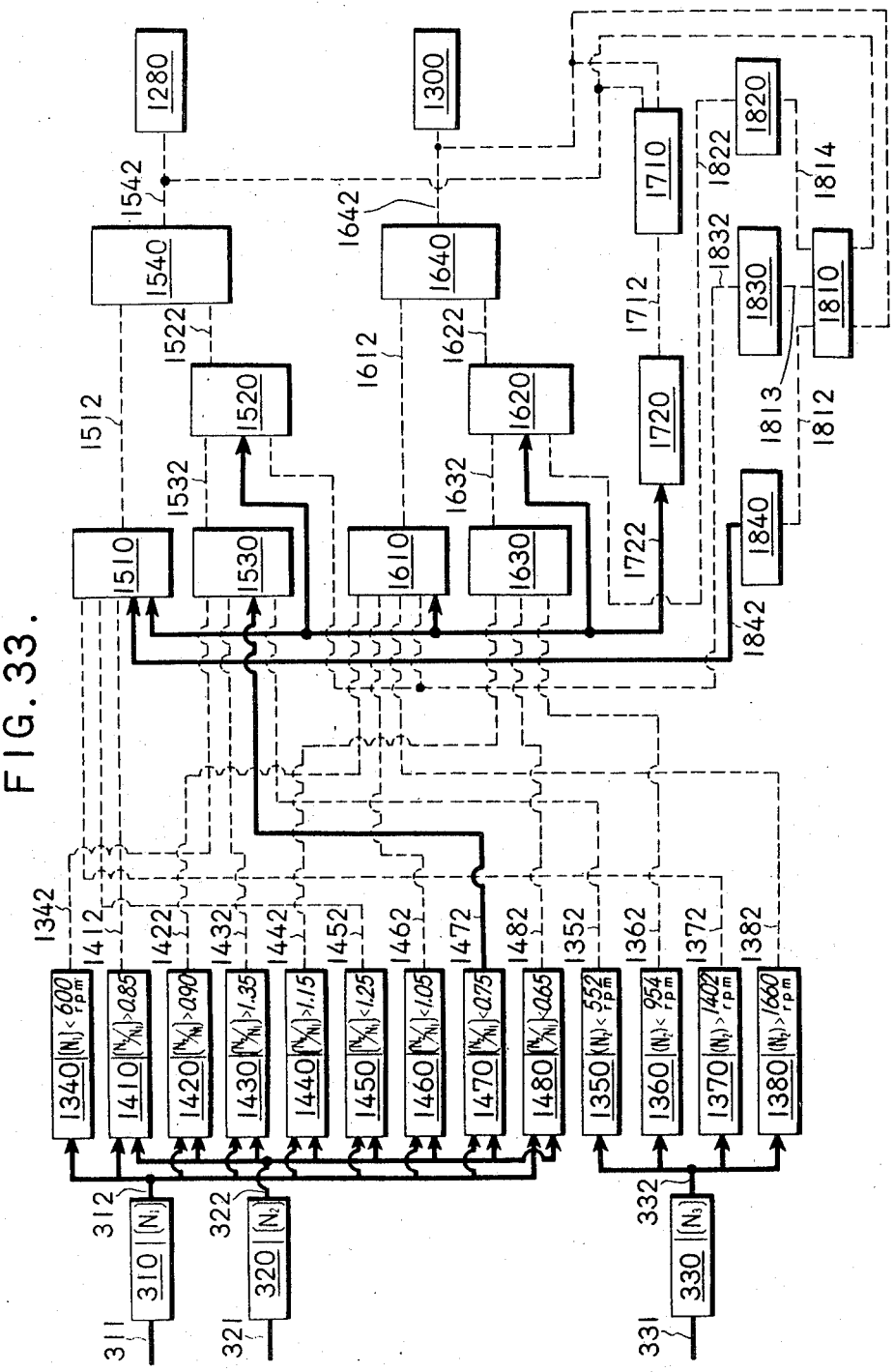
Figure 34:
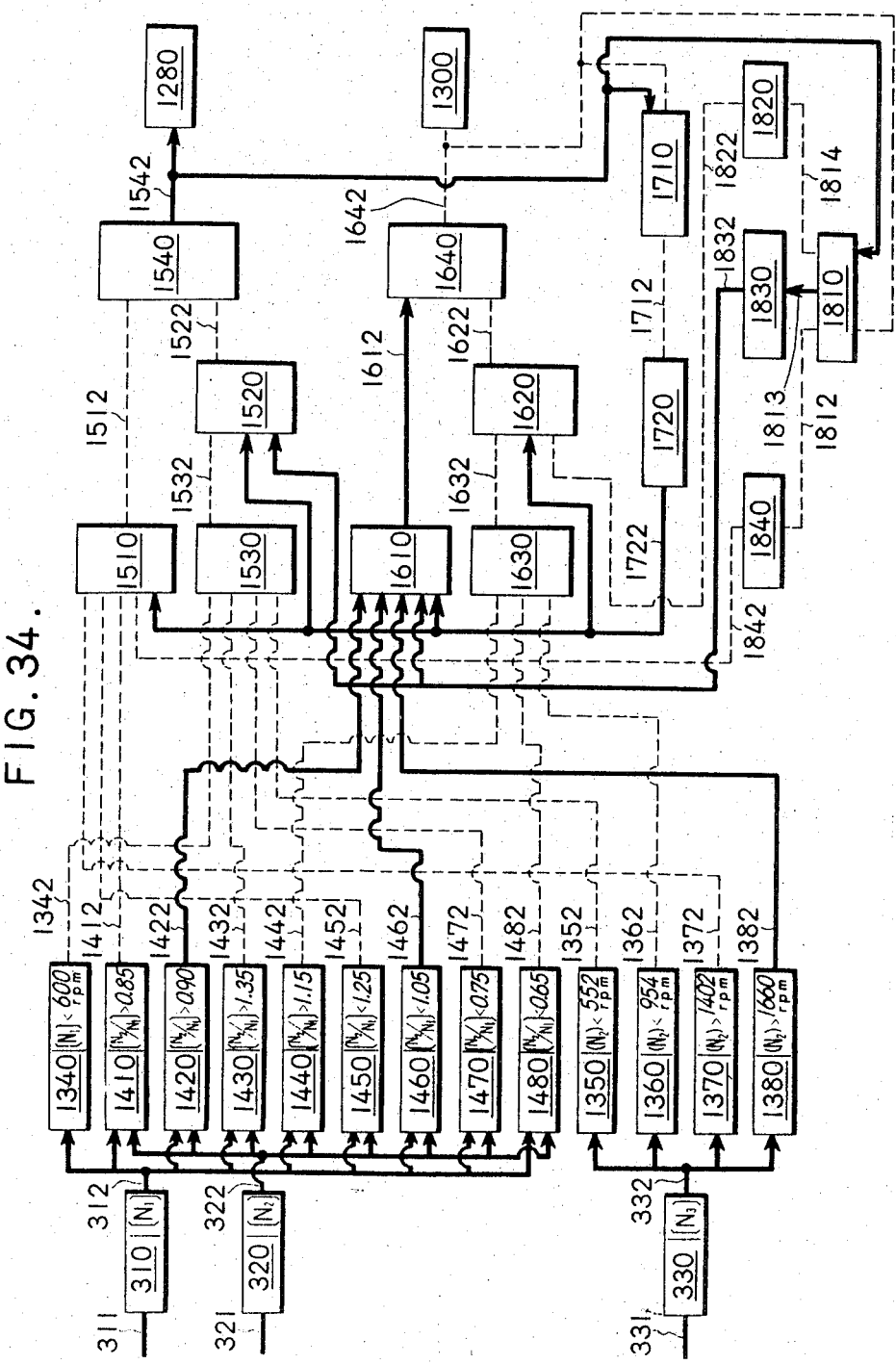
Figure 35:
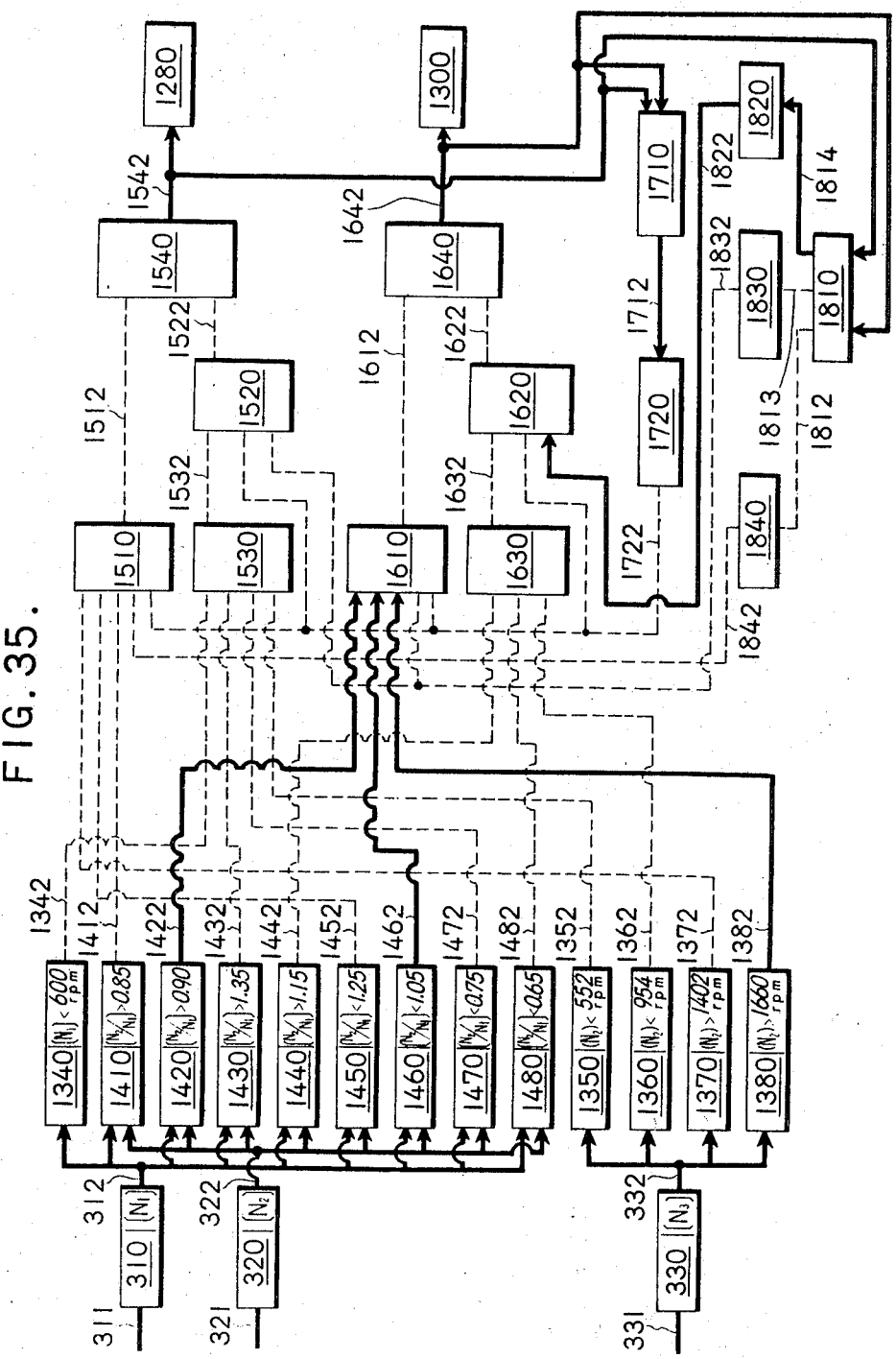
Figure 36:
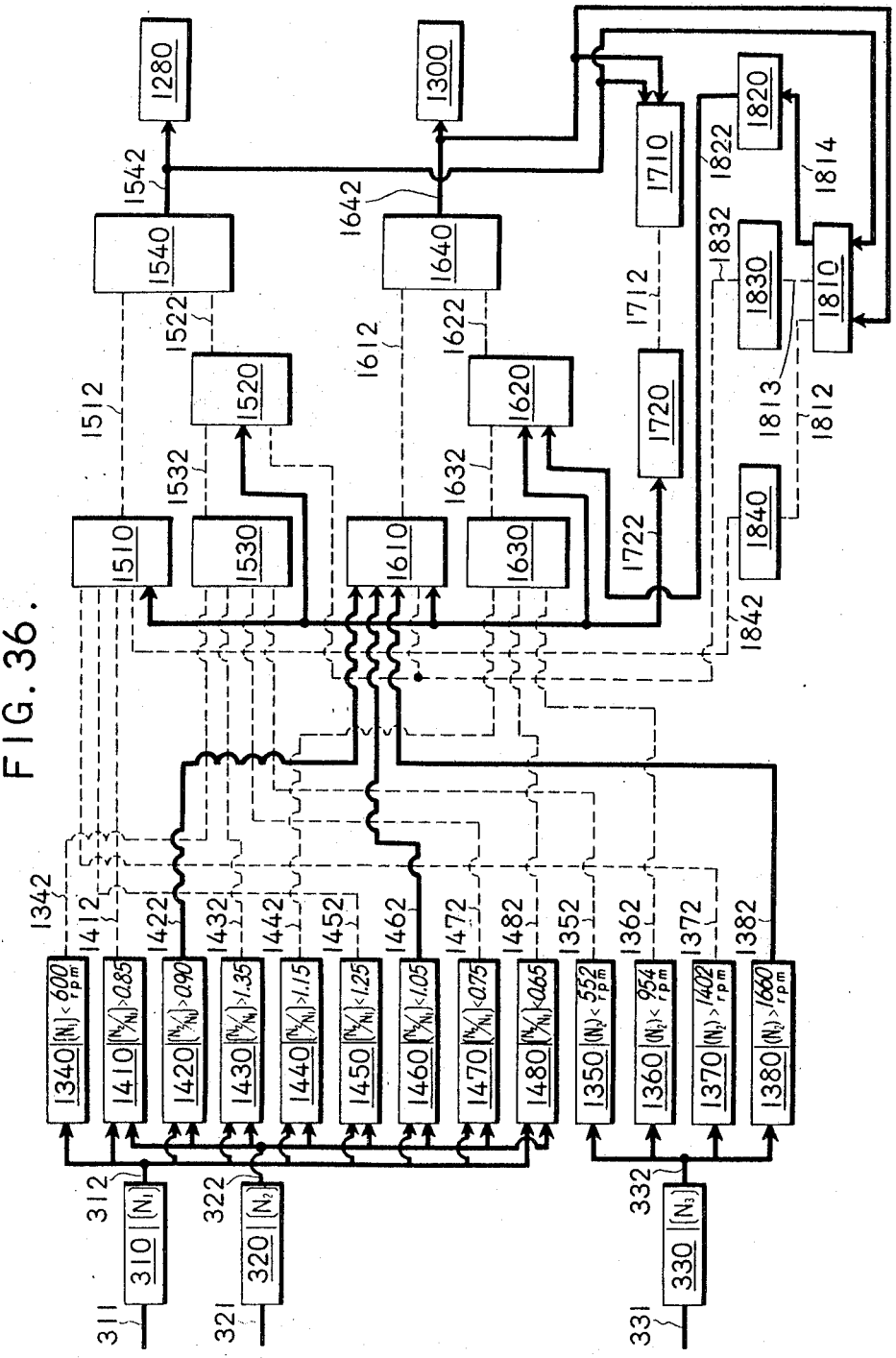
Figure 37:
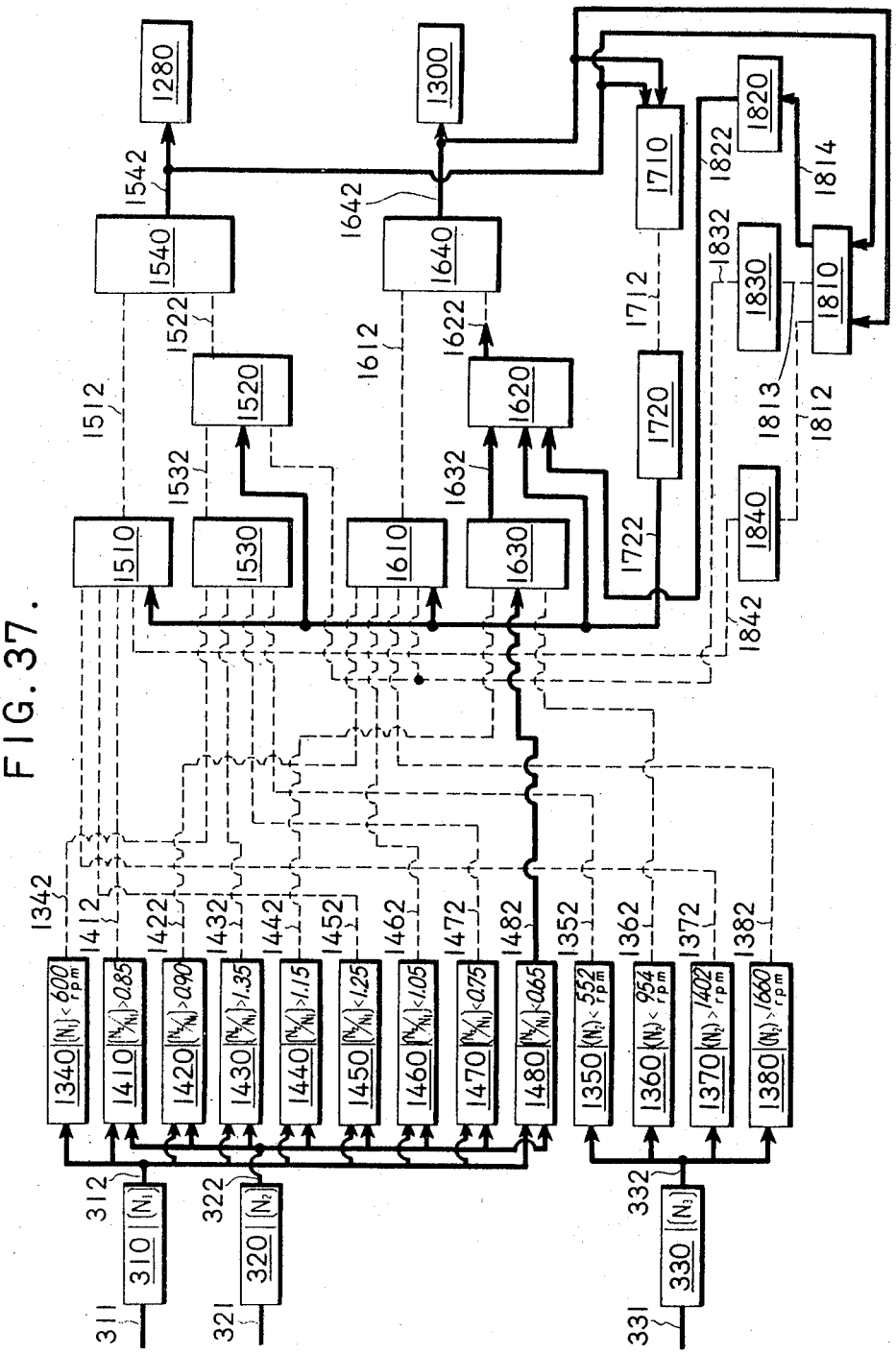
Figure 38:
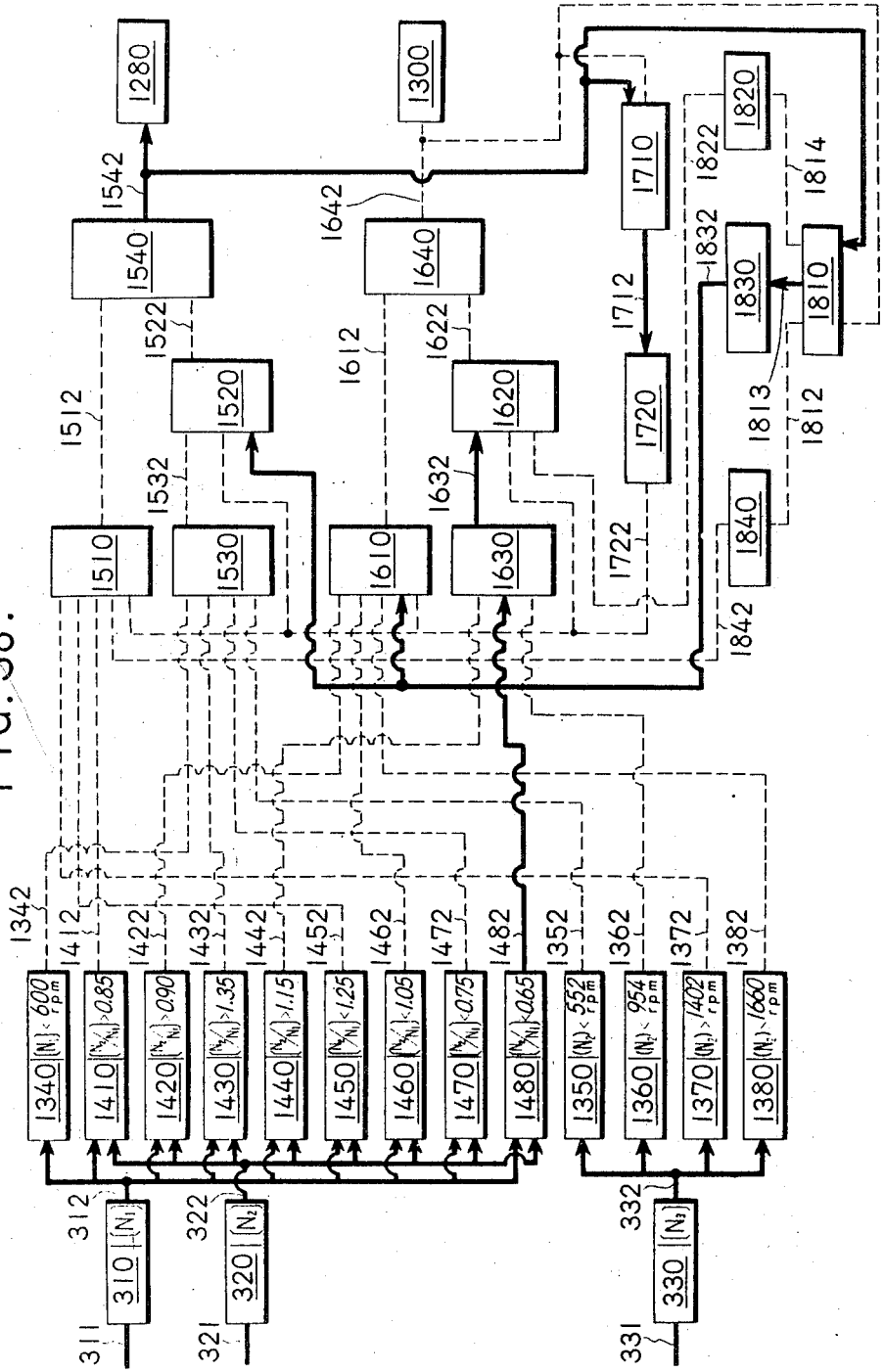
Figure 39:
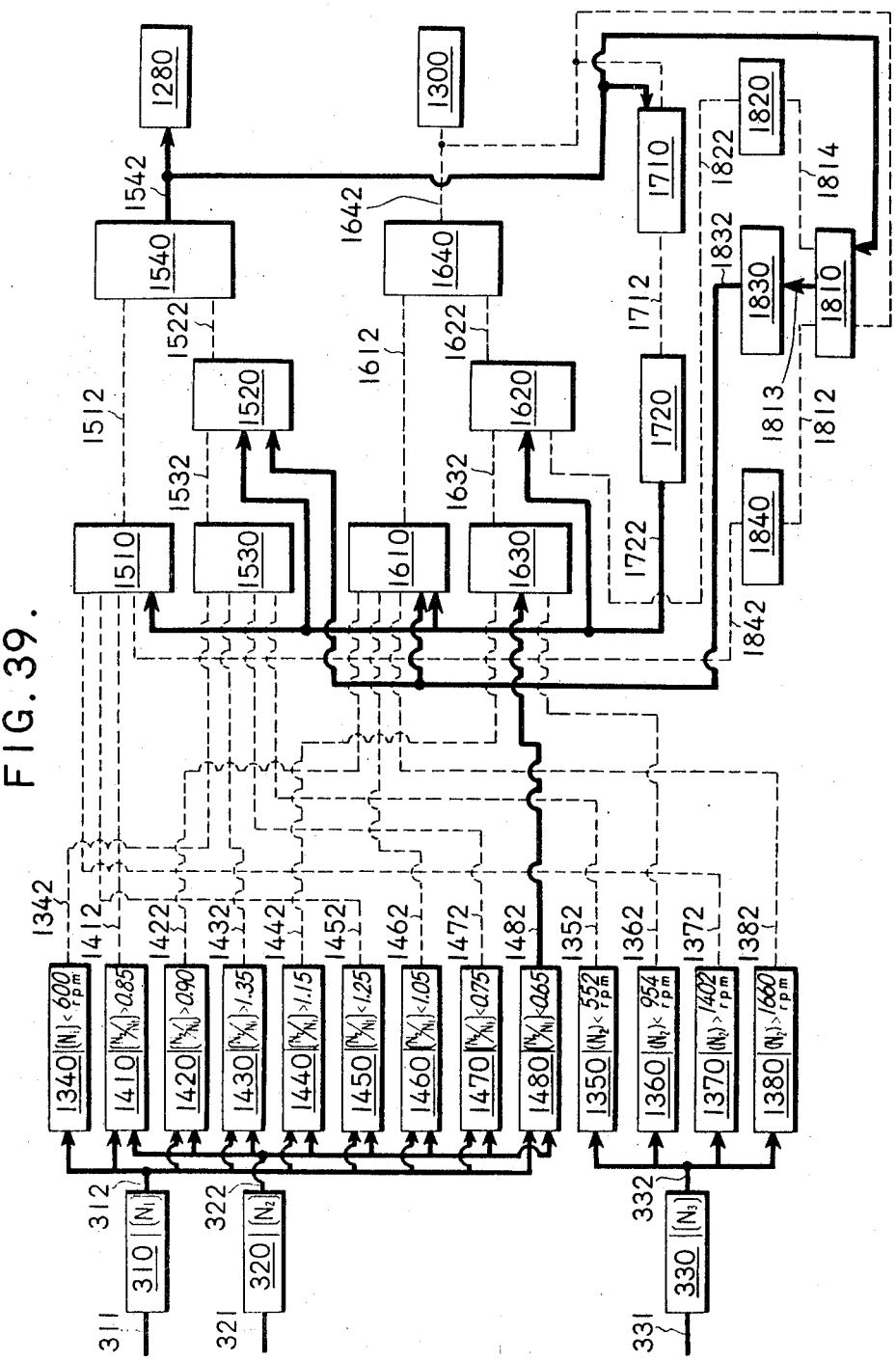

FIGS. 26A and B are diagrams showing examples of the speed change range wherein the present invention is applied to a forward three-speed automatic transmission;

FIG. 27 is a block diagram showing an example of the controlling device thereof;

FIG. 28 is a block diagram showing the logic computation thereof at the time of the speed change from low gear state into second gear state;

FIG. 29 is a block diagram showing the logic computation when a synchronous time-retaining signal is maintained after the speed change from the low gear state into second gear state;

FIG. 30 is a block diagram showing the logic computation thereof when the synchronous time-retaining signal is cancelled after the speed change from low gear state into the second gear state has been effectuated;

FIG. 31 is a block diagram showing the logic computation when the slip ratio attains a value below 0.75 during the speed change from the second gear state into low gear state;

FIG. 32 is a block diagram showing the logic computation at the time when synchronous time-retaining signal is maintained after the speed change from second gear state into low gear state;

FIG. 33 is a block diagram for showing the logic computation after the synchronous time-retaining signal is cancelled after the speed change from the second gear state into the low gear state has been effectuated;

FIG. 34 is a block diagram showing the logic computation at the time of the speed change from the second gear state into top gear state;

FIG. 35 is a block diagram showing the logic computation at the time when the synchronous time-retaining signal is maintained after the speed change from second gear state into the top gear state has been effectuated;

FIG. 36 is a block diagram showing the logic computation at the time when synchronous time-retaining signal is cancelled after the speed change from the second gear state into the top gear state has been effectuated;

FIG. 37 is a block diagram showing the logic computation when the slip rate becomes below 0.65 at the speed change from the top gear state into the second gear state;

FIG. 38 is a block diagram showing the logic computation when the synchronous time-retaining signal is maintained after the speed change from the top gear state into the second gear state has been effectuated;

FIG. 39 is a block diagram showing the logic computation after the synchronous time-retaining signal is cancelled after the speed change from the top gear state into the second gear state has been effectuated; and FIG. 40 is a block diagram showing the structure of the speed change gear position logic circuit.

The dominant features of the present invention reside in that as is shown in the embodiments, the main portion of the present invention is classified into hydraulic torque converter, oil pressure operating circuit, and electronic logic circuit.

The following are the detailed explanations with respect to embodiments of the present invention in accordance with the attached drawings, and in the following paragraphs what is cited as "pump member" stands for a pump-forming part of the hydraulic torque converter, and in regard to the pump for producing the fluid pressure to operate the friction-engaging means, the same may be referred to in the following paragraphs as "fluid pump" "oil pump" or "gear pump."

I. THE STRUCTURE OF FORWARD TWO-SPEED AUTOMATIC TRANSMISSION MECHANISM

Figure 1:
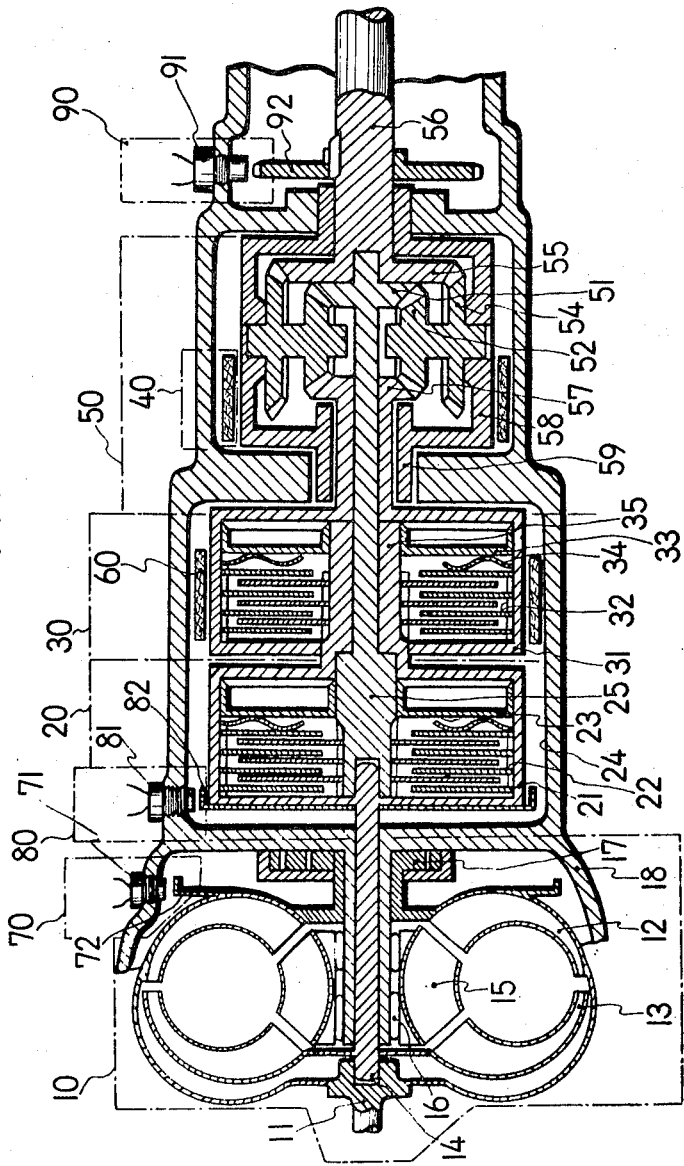

The transmission mechanism, as a typical example, comprises a forward two-speed gear transmission mechanism with hydraulic torque converter as is shown in FIG. 1, although the present invention is not restricted to the two-speed gear transmission mechanism, but may also be applied to three or more speed automatic transmission mechanisms.

The forward two-speed automatic transmission mechanism with hydraulic torque converter of this embodiment, is composed of the hydraulic torque converter 10, the front clutch 20, the rear clutch 30, the rear brake 40, and the gear train 50.

The input side of the hydraulic torque converter is of such a structure that the output shaft of the internal combustion engine (not shown) is directly connected to the hydraulic converter shaft 11, which shaft is directly connected to the hydraulic torque converter pump 12.

The hydraulic torque converter 10 is composed of the hydraulic torque converter pump 12 and the hydraulic torque converter turbine 13 faced against said pump 12, and a stator 15 having the one way clutch 16 is provided between said pump 12 and said turbine 13. Since the operations of these members are well known to those skilled in the art, a detailed explanation therefore with respect to these members is omitted here; except it is pointed out that the hydraulic torque converter pump 12 delivers a circulating flow, and the hydraulic torque converter turbine 13 transmits revolution to the turbine shaft 14 by means of momentum of said circulating flow.

In other words, revolution is transmitted from the hydraulic torque converter pump to the hydraulic torque converter turbine accompanied with the difference of revolutions hereinafter defined as "slip ratio."

When the value of slip ratio is small, the transmitted torque is small and when the value of slip ratio is great, the transmitted torque is also great, and the changing revolution ratios are transmitted and enter into the computations later described.

Oil pressure pump 17 is directly connected to the shaft 11 of hydraulic torque converter pump for the purpose described hereinafter.

The front clutch 20 is composed of the clutch drum 21 united to the hydraulic torque converter turbine shaft 14, multiple plate clutch 22, the clutch piston 23, the spring plate 24, and the clutch shaft 25, and when oil pressure is transmitted to the front clutch 20, the shaft 14 and the shaft 25 are connected by means of the clutch.

The rear clutch 30 is composed of the clutch shaft 35 united to the clutch drum 21, the clutch drum 31, the multiple plate clutch 32, the clutch piston 33, and the spring plate 34, and when oil pressure is transmitted thereto, the drum 21 and the drum 31 are connected by means of the clutch.

Figure 2:
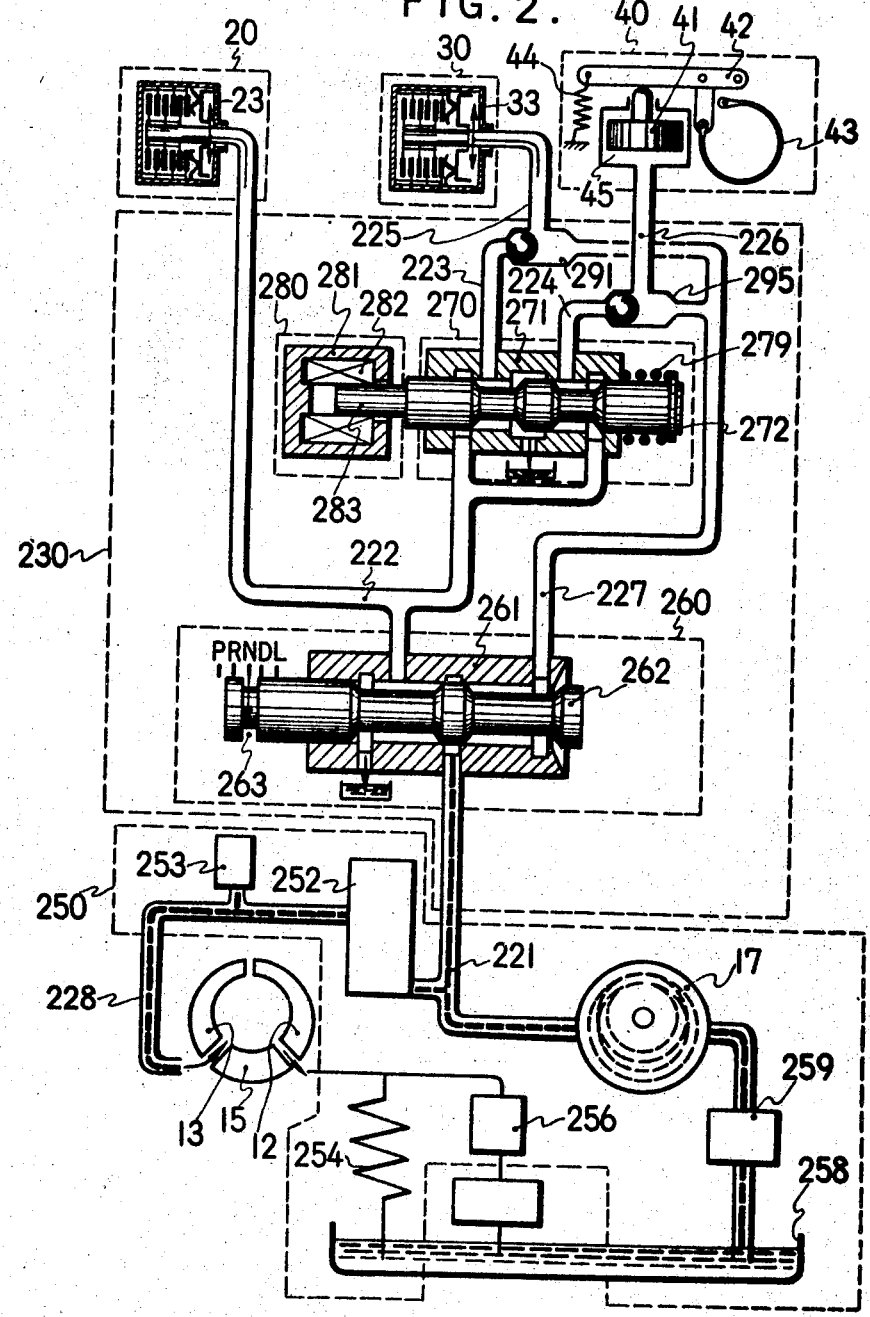

The rear brake 40 is comprised of the brake piston 41, the brake link 42, the brake band 43, the return spring 44, and the brake cylinder 45 as is shown in FIG. 2, and when oil pressure is transmitted thereto, the brake band 43 is operated to lock the carrier 58 of the gear train 50 against the housing 18 to stop revolution of the carrier.

The gear train 50 is a planet bevel gear mechanism composed of the first sun gear 51, the second sun gear 57, the third sun gear 55, the first planet gear 52, the second planet gear 54, the output shaft 56 and the carrier 58.

The first sun gear 51 and the second sun gear 57 of said gear train 50 are geared to the first planet gear 52, and the second planet gear 54 is united to the first planet gear 52, and is geared to the third sun gear 55.

Said planet bevel gear mechanism as it is activated enters speed change gearing states as follows:

[High gear state] DH

When the front clutch 20 and the rear clutch 30 are connected, the first sun gear 51 and the second sun gear 57 are revolved at the same revolution speed, and since the carrier 58 is free, the revolutions of the two sun gears become directly the output revolutions, and are transmitted at the relation of 1:1 (see FIG. 1 of the drawings).

[Low gear state] DL

When the front clutch 20 and the rear brake 40 are connected, the input revolution is transmitted to the first sun gear 51, and at the same time the carrier 58 is restrained from movement by means of the rear brake 40, and since the second sun gear 57 is free, the output revolution is 1/K of the input revolution. (K is the speed change ratio).

Reverse state R

When the rear clutch 30 and the rear brake 40 are connected and the input revolution is transmitted to the second sun gear 57, and the first sun gear 51 is free, and the carrier 58 is restrained from movement by means of the rear brake 40, the revolution of the output shaft 56 is reversed, and the revolution of the output shaft is 1/K of the input revolution.

II. R.P.M. DETECTOR

The detector 70 for detecting the number of revolutions of the shaft 11 of the hydraulic torque converter pump is composed of the revolution detector 71 (which is described in detail hereinafter) provided on the housing 18 and the toothed disc 72 provided on the hydraulic torque converter pump 12, and when the number of the teeth of the toothed disc 72 is set to be $n_1$ (for example $n_1=32$), electric signal $S_1$ which is $n_1$ times the number of revolutions $N_1$ of the shaft 11 of the hydraulic torque converter pump 12 can be obtained at the revolution detector 71.

The shaft of the internal combustion engine and the shaft 11 as hereintofor indicated are connected, and therefore the detection of said electric signal is the detection of the number of revolutions (r.p.m.) of the internal combustion engine so that ($S_1=n_1N_1$).

The detector 80 for detecting the number of revolutions (r.p.m.) of the shaft 14 of hydraulic torque converter turbine is composed of the revolution detector 81 (which can be of the same structure as the detector 71) provided on the housing 18, and the toothed disc 82 (which can be of the same structure as the toothed disc 72), the toothed disc 82 being provided on the front clutch drum 21 which is united to the shaft 14 of the hydraulic torque converter turbine 13, and when the number of the teeth thereof is set at $n_2$ (for example $n_2=32$), the electric signal $S_2$ which is $n_2$ times the number of revolutions (r.p.m.) $N_2$ of the shaft 14 can be detected by the revolution detector 81 ($S_2=n_2N_2$).

In regard to the detection of the number of revolutions (r.p.m.) of the shaft 14 of the hydraulic torque converter turbine, the value obtained at another position shown as the detector 90 for detecting the number of revolutions (r.p.m.) of the output shaft 56 for example, can be substituted for the value detected by the detector 80, it being within the revolution of the shaft 14 of the hydraulic torque converter turbine to attain the object of the present invention.

The detector 90 for detecting the number of revolutions (r.p.m.) of the output shaft 56 of the gear train is composed of the revolution detector 91 (which can be of the same structure as those detectors 71, 81), and the toothed disc 92 united to the output shaft 56, and when the number of teeth thereof is set to be $n_3$ (for example $n_3=32$), electric signal $S_3$ which is $n_3$ times the number of revolutions (r.p.m.) $N_3$ of the output shaft 56 can be obtained at the revolution detector 91 ($S_3=n_3N_3$).

When the speed change ratio is set to be $K$, such a relation as is shown by the following formula can be obtained between $S_2$ and $S_3$.

$$S_2 = K(n_2/n_3) S_3$$

or $$(S_3 = (n_3/n_2K) S_2)$$

where $K=N_2/N_3$ (speed change ratio.)

In other words, it will be understood that the number of revolutions $N_2$ of the shaft 14 of the hydraulic torque converter turbine 13 can be obtained from the number of revolutions $N_3$ of the output shaft 56 through the above calculation formulas.

By ascertaining the number of revolutions $N_3$ of the output shaft 56, the running state of the vehicle may be obtained, i.e., the car speed, and by ascertaining the number of revolutions $N_1$ of the shaft 11 of the hydraulic torque converter pump 12, the number of revolutions of the internal combustion engine may be obtained.

On the other hand, by ascertaining the number of revolutions of the shaft 14 of hydraulic torque converter turbine 13 we may obtain the revolution ratio of the shaft 11 of the hydraulic torque converter pump 12 and the shaft 14 of the hydraulic torque converter turbine 13, and thereby obtain the slip ratio of the hydraulic torque converter, and as a result one may obtain the transmitted torque of the hydraulic torque converter.

In the following paragraphs, the structure of detectors 70, 80 and 90 are explained by taking as an example the detector 90 for detecting the number of revolutions of the output gear shaft 56 in accordance with the showing in 8A and 8B.

Figure 8A:
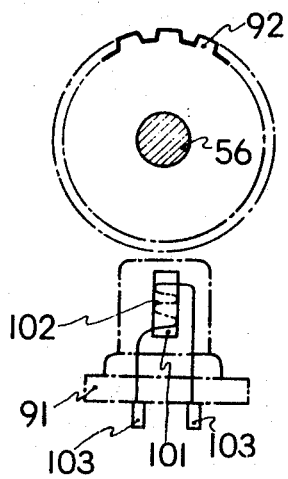
FIGS. 8A and 8B are diagrammatic showings of the structure of the r.p.m. (revolutions per minute) detecting device thereof.

The toothed disc 92 whose revolution center is fixed onto the output shaft 56, is a round plate made of magnetic material having 32 teeth formed on the periphery thereof with equal intervals between said teeth as is apparent from the side view thereof illustrated in FIG. 8A, and the revolution detector 91 being disposed on the housing 18 at a position close to the outside in the diametrical direction thereof.

The revolution detector 91 is composed of the permanent magnet 101 and the coil 102 wound therearound, and these are contained in an appropriate casing made of nonmagnetic material, and the permanent magnet 101 is fixed into the speed change gear housing by said casing in such a manner that the end portion of the permanent magnet 101 can be placed close to the outer periphery of the toothed disc 92.

When the toothed disc 92 is revolved and the toothed portion thereof passes by the magnetic field of the permanent magnet 101, the leakage flux of the permanent magnet 101 is changed and an electromotive force is generated in the coil 102 with 103 representing the output terminal.

In the case as shown in FIG. 8A, 32 pulses of voltage signals can be generated by one revolution of the toothed disc 92.

Generally speaking, the voltage signal generated when the number of revolutions of the toothed disc, the number of the teeth thereof being $n_3$, is $N_3$ for a predetermined period of time, can be obtained by the voltage $S_3$ of the value of $n_3$ times $N_3$.

The toothed discs 72, 82 respectively in the detector 70 for detecting the number of revolutions of the shaft 11 of the hydraulic torque converter pump 12, and the detector 80 for detecting the number of revolutions of the shaft 14 of the hydraulic torque converter turbine 13 are respectively the same as the toothed disc 91 insofar as the outer peripheral forms thereof are concerned, but are different only in the method for attaching the same to the hydraulic torque converter turbine 13 or the clutch drums.

Figure 7:
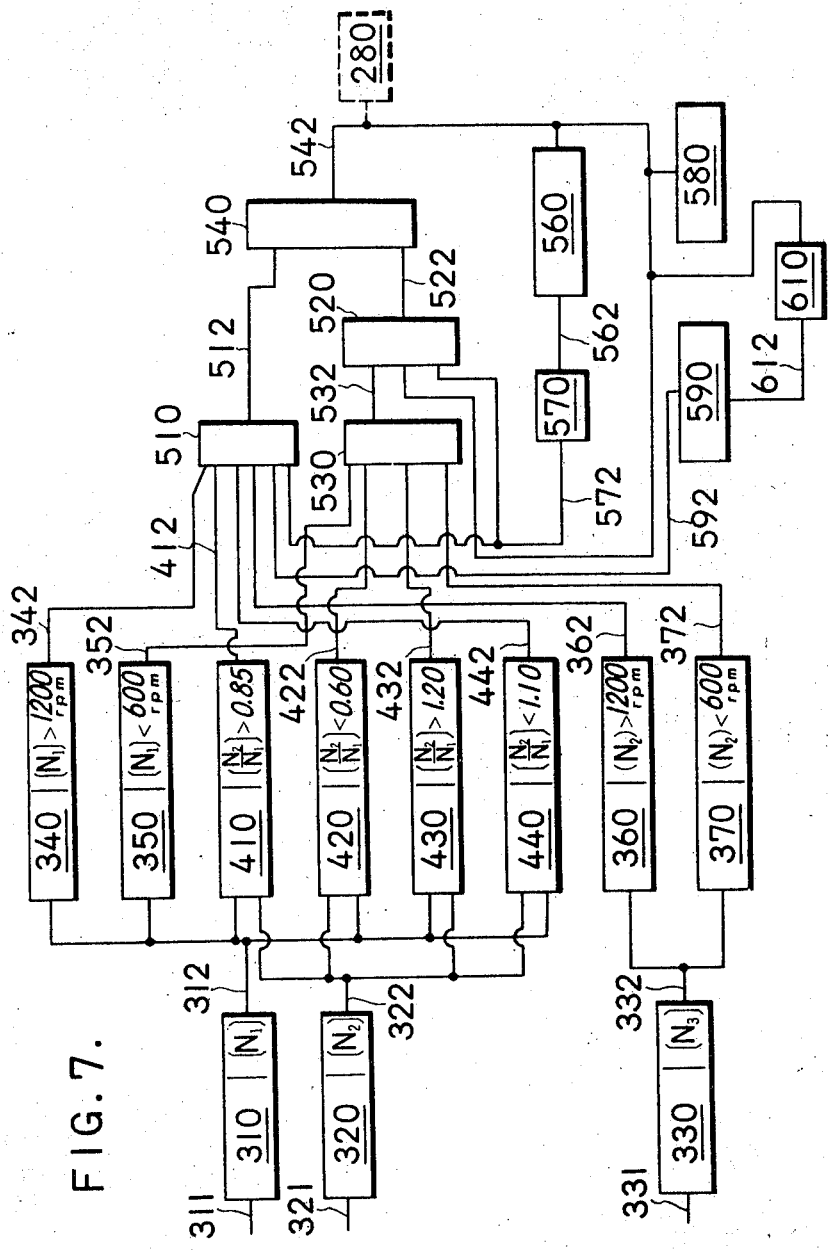
FIG. 7 is a block diagram showing the structure of the electronic computing circuit as an embodiment of the present invention.

The output signal voltages $S_1$, $S_2$, $S_3$ of the three detectors 70, 80, 90 for detecting the number of revolutions are respectively introduced into the lines 311, 321, 331, as shown in FIG. 7.

The second point of the present invention resides in that the respective number of revolutions are detected as electric signals, and the respective number of revolutions and revolution ratio are electronically computed from the electric signals to transmit speed change signals through logic circuitry, to the oil pressure operation of fluid circuit 230 as illustrated in FIGS. 2 through 5, thus in accordance with the predetermined speed change pattern, the speed of the gear train 50 can be changed by said operation of fluid circuit 230.

III. OIL PRESSURE OPERATION CIRCUIT

The structure of the oil pressure operation circuit when the present invention is applied to the forward two-speed automatic transmission, is shown in FIGS. 2, 3, 4, and 5, and it can be classified into the oil pressure source 250 and the fluid operation circuit 230, and the operation circuit 230 is composed of the manual valve 260, the electrically operated selective distribution valve 270, the solenoid 280, the check valves 291 and 295 and the oil paths.

The oil pressure source 250 is composed of the oil pressure pump 17, the oil filter 259, the oil pan 258, the pressure control valve 256, the pressure control valve 252, the relief valve 253, and the oil cooler 254, and said oil pressure source 250 has the function to supply hydraulic torque converter operation oil, gear lubricant oil and oil under pressure for said oil pressure operation circuit.

These specific elements of an oil pressure circuit are well known to those skilled in the art and therefore the explanations thereof are omitted here.

The manual valve 260 is composed of the valve shaft 262 and the valve box 261, and the valve shaft 262 is moved interlockingly by shifting the control lever (not shown) to the positions of P. R. N. D. L. (which are generally known gearing positions; wherein P stands for parking; R stands for reverse; N stands for neutral; D stands for drive; and L stands for low gear), and the positions of P. R. N. D. L. shown in FIG. 2 are the positions of the valve shaft 262 operated in relation thereto, the groove 263 on the left end portion of the valve shaft 262 being the groove for inserting the connecting link from the manual control lever (not shown).

When the manual valve 260 is on N position, as is shown in FIG. 2, the oil path 221 is closed, and the oil paths 222, 227 are opened (by "opened" is meant that no fluid passes through the paths specified).

Figure 3:
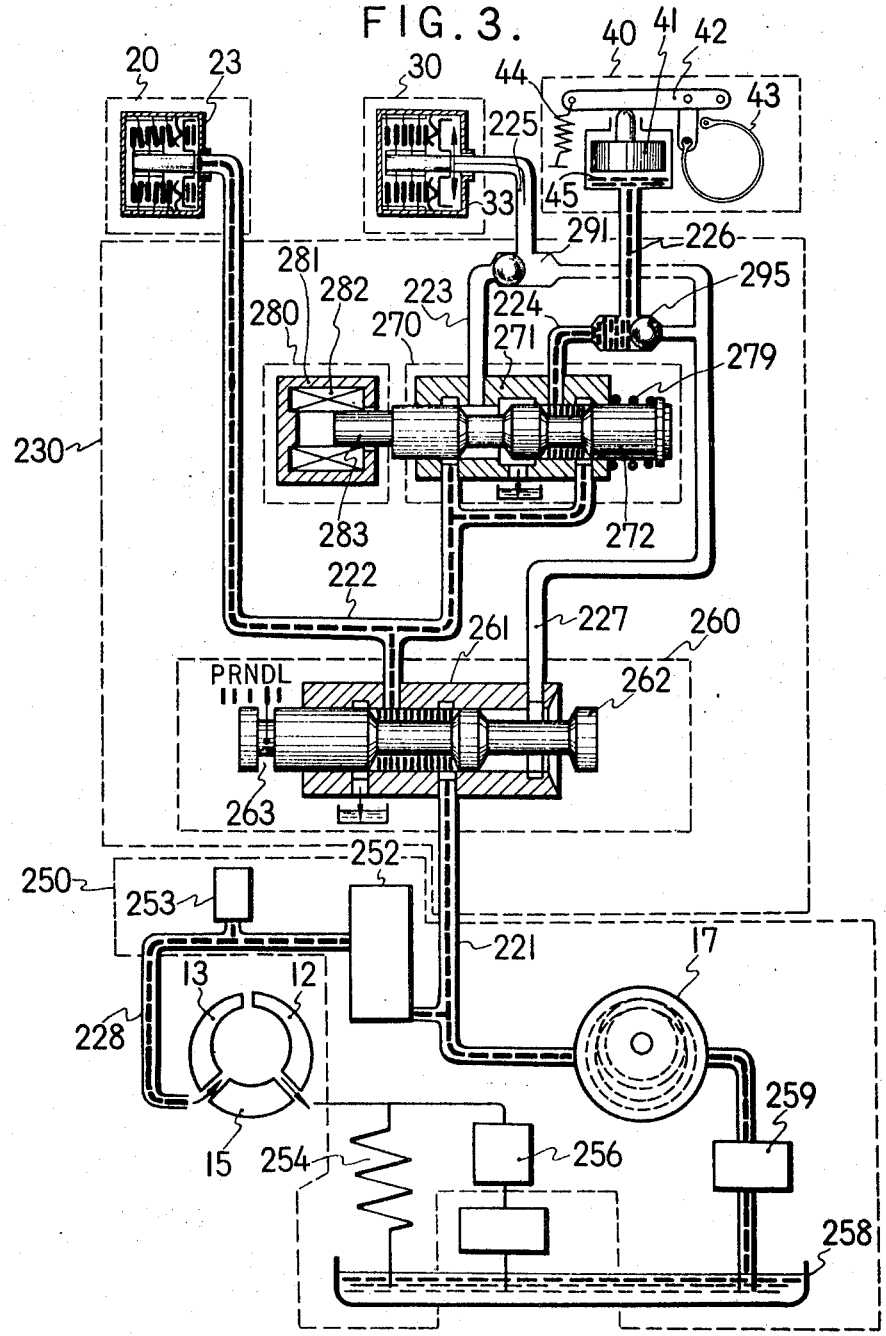

When the manual valve 260 is placed on L position (not shown), the oil paths 221, 222 are connected in the same manner as in the state of D.L. positions shown in FIG. 3, and the oil path 227 is opened. In this case, however, the solenoid 280 is not conductive since current does not pass through the coil 282.

Figure 4:
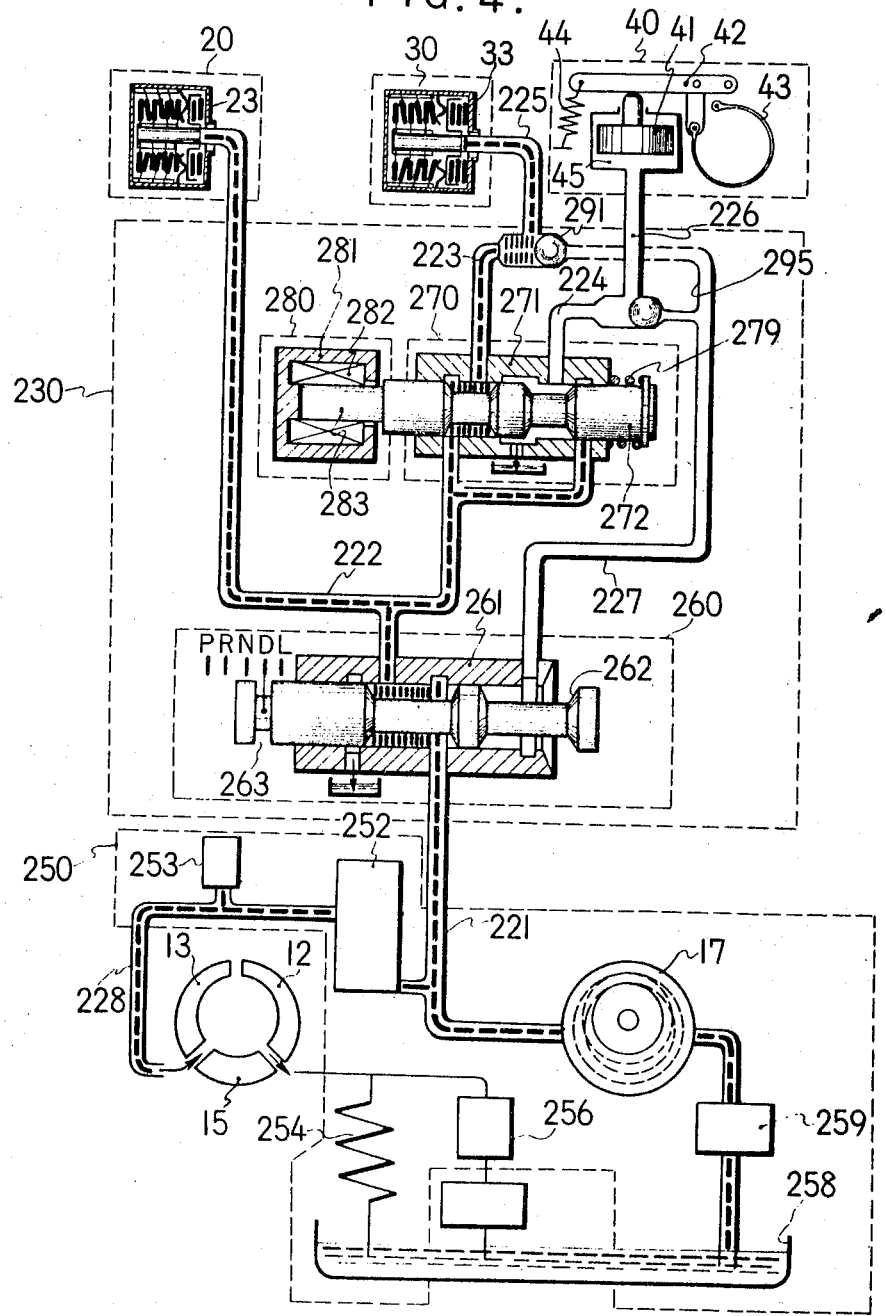

When the manual valve 260 is placed on position D, as is shown in FIGS. 3 and 4, the oil path 221 and 222 are connected, and the oil path 227 is opened, thus defining the DL state. When the solenoid 280 is conductive, the current passes through coil 282 and the transmission attains the DH state, later described in detail.

On the other hand, when the manual valve is placed on position R, as is shown in FIG. 5, the oil path 221 and 227 are connected, and the oil path 222 is opened.

When the manual valve is placed on position P, the oil path 221 is closed, and oil paths 222 and 227 are opened (as shown in FIG. 2).

The shift valve 270 has the valve box 271 and the valve shaft 272, and one end of the valve shaft 272 (the left end in the diagram) is connected to the moving core 283 of the solenoid 280.

When the solenoid 280 is not conductive, the valve shaft 272 is set to the right by means of the spring 279 connected to the other end (the right end in the drawing) of said valve shaft 272, and the oil path 222 and the oil path 224 are connected, and the oil path 223 is opened (see FIG. 3).

On the other hand, when the solenoid 280 is conductive, it is moved to the left, and the oil path 222 and the oil path 223 are connected, and the oil path 224 is opened (see FIG. 4).

When the operation oil pressure is in effect in the oil path 223, the check valve 291 connects said oil path 223 to the oil path 225, and closes the oil path 227.

When the operation oil pressure is in effect in the oil path 227, the check valve 291 connects said oil path 227 to the oil path 225, and closes the oil path 223 (see FIGS. 4 and 5).

When the operation oil pressure is in effect in the oil path 224, the check valve 295 connects said oil path 224 to the oil path 226 and closes the oil path 227.

When the operation oil pressure is in effect in the oil path 227, the check valve 295 connects said oil path 227 to the oil path 226 to close the oil path 224 (see FIGS. 3 and 5).

When current is passed through the coil 282 of the solenoid 280, the moving core 283 is attracted and moved to the left (along with the valve shaft 272 of the shift valve 270) (see FIG. 4), and when current is not passed therethrough, the moving core 283 is returned back to the right side (see FIG. 3).

While the solenoid 280 is illustrated as the electrical actuator in the various embodiments, it is within the spirit of this invention to provide other types of actuator devices for converting an electric signal into a mechanical displacement.

The speed ratio of the gear train 50 can be changed into the respective states of N.D.L.R.P. by the above-mentioned oil pressure elements, as is outlined in more detail in the following paragraphs:

1. N state

As is shown in FIG. 2, the operative oil pressure is cut off by the manual valve 260, and all conduit paths to the actuators of the front clutch, the rear clutch, and the rear brake are opened so that the actuators of the friction-engaging means do not operate. The hydraulic torque converter turbine shaft 14 is freely revolved, and the vehicle does not run.

In the drawings the conduit paths showing thick dotted lines indicate that operation oil under pressure is passing therethrough to the appropriate friction-engaging means.

2. D state

There are two states in the D designation, i.e., DL state and DH state. In other words, the DL state shows the low gear state of the D designation, and DH state shows the high gear state of the designation.

DL state

As is shown in FIG. 3, the valve shaft 272 of the shift valve 270 is disposed at the right, and the valve shaft 262 of the manual valve 260 is placed on D position, and the solenoid is nonconductive, the operation oil under pressure is supplied to the conduit paths 221, 222, 224 and 226 to apply fluid under pressure to the front clutch 20 and the rear brake 40; in this instance the rear clutch 30 is opened, and thereby the gear train of the vehicle is in the low gear state.

DH state

As is shown in FIG. 4, the valve shaft 262 of the manual valve 260 is in D position, and the valve shaft 272 of the shift valve 270 is disposed at the left, the solenoid 280 being conductive and the operation oil under pressure is supplied to the oil paths 221, 222, 223, and 225 to apply fluid pressure to the front clutch 20 and the rear clutch 30, and in this instance the rear brake 40 is opened, and thereby the gear train 50 of the vehicle is in high gear state.

3. L state

L state is attained when the valve shaft 262 of the manual valve 260 is disposed in L position, and the valve shaft 272 of the shift valve 270 is placed on the right position, the solenoid 280 is not conductive, the operation oil under pressure passes through the same oil paths as in FIG. 3 and pressurizes the front clutch 20 and the rear brake 40, and the rear clutch 30 is opened and thereby the gear train 50 of the vehicle is in low gear state.

4. R state

As is shown in FIG. 5, the valve shaft 262 of the manual valve 260 is disposed on R position, and the valve shaft 272 of the shift valve 270 is disposed at the right. In this instance, the operation oil under pressure passes through the oil paths 221, 227, 225, 226, and applies fluid pressure to the rear clutch 30 and the rear brake 40; the front clutch 20 is opened so that the gear train 50 of the vehicle is in reverse (R) state.

5. P State

The P state of the vehicle may be attained when the valve shaft 262 of the manual valve is placed on P position, and the valve shaft 272 of the shift valve is disposed on the right side, and the operation oil under pressure is cut off by the valve shaft 262 in the same manner as in N state in FIG. 2, and all the actuators of the friction engaging means are opened.

Although it is not shown in the diagram, the parking device interlocked to the manual valve 260 is provided on P position, and the output shaft 56 is mechanically fixed as is known to those skilled in the art.

Thus, the automatic transmission carries out automatically the speed change of DH and DL and it can be performed by rendering the solenoid 280 conductive and not conductive.

The speed change range in which conductivity or nonconductivity to the solenoid is carried out at the speed change point is delineated in the following paragraphs.

IV. SPEED CHANGE RANGE

As described before, the state of the internal combustion engine can be obtained from the number of revolutions $N_1$ of the shaft 11 of hydraulic torque converter pump, the state of the hydraulic torque converter can be obtained from the slip ratio, and the running state of the vehicle can be obtained from the number of revolutions $N_3$ of the output shaft 56, and therefore the speed change point required of the vehicle can be determined thereby.

A. Control of the number of revolutions of internal combustion engine

Generally speaking, an internal combustion engine cannot produce smooth revolutions when the number of revolutions is below a certain point, and therefore when speed change is effectuated from low gear state into the high gear state, it is preferable that speed change be effectuated at a low number of revolutions of the combustion engine shaft; hence, in such case, speed change must be effectuated above a minimum number of revolutions specific to said internal combustion engine.

In carrying out the speed change from the high gear state into the low gear state, it is preferable to maintain the combustion engine revolution at low value, i.e., until the number of revolutions is reduced to an effective low range.

B. Control of car speed

When a vehicle, in particular, an automobile changes speed from low gear state into high gear state, it is preferable not to effectuate engine revolution (the vehicle speed) at too low value while the vehicle is in high gear state, since acceleration cannot satisfactorily be developed as desired at low vehicle speed for change from the lower to the higher gear state.

When a vehicle is driven from high gear state into low gear state, it is preferable not to drive in low gear state because of the noise or vibrations, and therefore it is preferable to drive the vehicle in high gear state until the vehicle runs at as low speed as possible.

C. Control of slip ratio

In the torque transmission of hydraulic torque converter, the transmission efficiency is affected considerably, depending on the case where the slip ratio (the slip ratio value can be represented by $N_2/N_1$) is less than the value close to 1 and the case where the slip ratio is greater than that of the aforesaid value.

In other words, in the former case, the torque is transmitted to the output shaft 56 from the internal combustion engine, and in the latter case, the output shaft 56 transmits torque for driving the internal combustion engine.

Following is the explanation with respect to the above-mentioned two cases.

C-1. The case in which the hydraulic torque converter transmits torque to the output shaft 56 from the internal combustion engine This is the state of the ordinary running or the hill climbing of the vehicle.

When speed change is carried out from low gear state into high gear state, it is preferable to carry out the speed change in such a range that the slip ratio is close to 1 in order to utilize the performance of hydraulic torque converter.

Figure 6A:
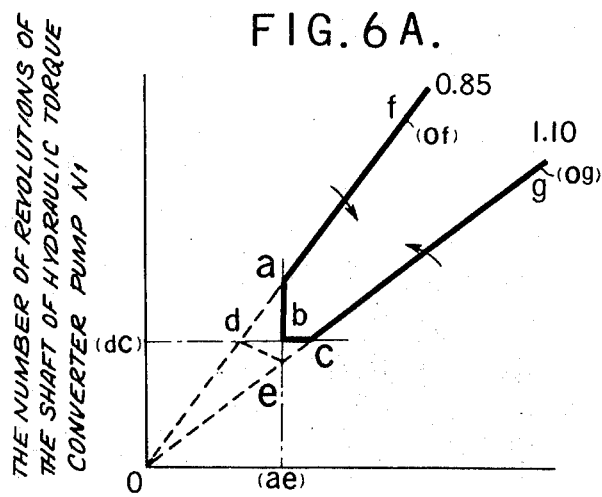
FIGS. 6A, 6B and 6C are diagrams showing examples by way of graphs of the speed change range.

The range of the slip ratio is from 0.5 to 1.00 in most cases, and in the case shown in FIG. 6A where the present invention is applied to forward two speed automatic transmission, the speed change point is determined to be 0.85.

When speed change is intended to be carried out from high gear state into low gear state, it is preferable to carry out the speed change when the slip ratio is of a value lower than 0.85 and in this instance to utilize the performance of hydraulic torque converter.

The range of speed change, determined by the performance of hydraulic torque converter, has the upper limit of slip ratio, a and the upper limit is about 0.9, and in this example (see FIG. 6B) the slip ratio is 0.60.

C-2. The case in which the hydraulic torque converter transmits torque from output shaft 56 to the internal combustion engine This case can be divided into two running states, i.e., (1) the running state at reduced speed which is generally called the engine brake state, and (2) the accelerated running state as in down slope movement.

When it is necessary to carry out speed change from low gear state into high gear state, it is required to gradually accelerate in the running state, and in such case it is preferable to carry out the speed change at the slip ratio close to 1.

In other words, the range of speed change is restricted to preferable slip ratio in the neighborhood of the slip ratio of 1.00 as is determined from the performance of hydraulic torque converter, and the range of slip ratio is within the range from 0.9 to 1.3, and in case shown in FIG. 6A, the speed change point is determined to be 1.10.

When it is necessary to carry out speed change from high gear state into low gear state, when strong braking is required in the running state for abrupt reduction of speed, or for speed control in down movement, there is a tendency that the slip ratio reaches a higher value than 1. In such case, it is necessary to use the engine brake by carrying out speed change into low gear state as quickly as possible before the slip ratio becomes too high.

Figure 6B:
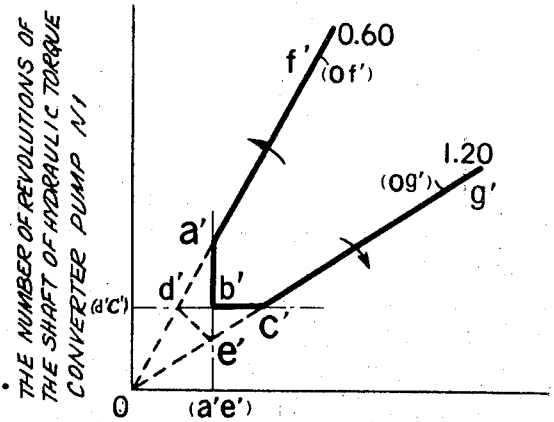

In other words, the range of speed change is restricted to the slip ratio above a definite value determined by the performance of hydraulic torque converter, where the range of speed change may have a lower limit of slip ratio in the range of 1.00 as determined by the revolution of hydraulic torque converter and in case as illustrated in the showing of FIG. 6B, it is determined to be 1.20.

As has been described in the preceding paragraphs, with respect to the conditions for carrying out speed change from low gear state to high gear state, there are four kinds of restrictions on speed change, i.e., the number of revolutions of internal combustion engine, car speed, the slip ratio when torque is transmitted from internal combustion engine to the output shaft 56, and the slip ratio when torque is transmitted from the output shaft 56 to the internal combustion engine, and when all the conditions beyond said restrictions develop (see arrows of FIG. 6A) it is geared into high gear state.

As the conditions for speed change from high gear state to low gear state there are four kinds of restrictions on speed change i.e., the number of revolutions of internal combustion engine, car speed, the slip ratio when torque is transmitted from the internal combustion engine to the output shaft 56, and the slip ratio when torque is transmitted from the output shaft 56 to the internal combustion engine, and when a condition beyond said restrictions develops (see arrows of FIG. 6B), it is geared into low gear state. The four kinds of restrictions on speed change are respectively independent conditions, and when any of said conditions develop, speed change can be carried out.

The above are the explanations as to the conditions of vehicle speed, which may be detected by the number of revolutions $N_3$ of the output shaft 56 as mentioned heretofore, and when the detected number of revolutions is computed into the number of revolutions $N_2$ of hydraulic torque converter turbine shaft in accordance with the above-mentioned calculation formulas, the same may be represented as the diagram on a plane, and therefore explanation is given herein by using the value computed into the number of revolutions $N_2$.

The above are the explanations about the speed change restrictions, and the actual speed change can be carried out under the most preferable conditions within said restrictions by using the most preferable speed change point (or line) determined by the performance of the internal combustion engine, the performance of hydraulic torque converter and the performance of the vehicles.

The above is more specifically delineated by the engine vehicle, as is shown in FIG. 6.

TABLE I

| | |
|---|---|
| The number of revolutions of the internal combustion engine as speed change point (or line) from low-gear state into high-gear state | 1200 r.p.m. (constant) |
| The number of revolutions of the output shaft 56 (corresponding to the car speed) (the computed value in $N_2$) | 1200 r.p.m. (constant) |
| Slip ratio when torque is transmitted to the output shaft 56 from the internal combustion engine | 0.85 (constant) |
| The slip ratio when torque is transmitted from the output shaft 56 to the internal combustion engine | 1.10 (constant) |

These values may be represented by the straight lines $(dc)$, $(ae)$, $(of)$ and $(og)$ (see FIG. 6A).

The above-given values are the speed change points (or lines), and speed change is carried out in the speed change range beyond the above-given values.

In other words, speed change is carried out when the values therefore are within the range surrounded by points $f, a, b, c$ and $g$, and the connecting lines therebetween of the diagram.

In this case, the range within the area by the points (or the lines connecting the same), viz $a, b,$ and $d$, or the points $b, c,$ and $e$, can also satisfy the conditions, and the same may be considered as the speed change range.

It is within the spirit of the invention that the range within the points (and the lines connecting the same) $d, b,$ and $e$ can also be used as speed change range.

TABLE II

| | |
|---|---|
| The number of revolutions of the internal combustion engine as the speed change point (or line) from high-gear state into low-gear state | 600 r.p.m. (constant) |
| The number of revolutions of the output shaft (corresponding to the car speed) (computed value in $N_2$) | 600 r.p.m. (constant) |
| Slip ratio when torque is transmitted from the internal combustion engine to the output shaft 56 | 0.6 (constant) |
| The slip ratio when torque is transmitted from the output shaft 56 to the internal combustion engine | 1.20 (constant) | which are shown by the straight lines $(d'c')$, $(a'e')$, $(of')$ and $(og')$ (see FIG. 6B).

Therefore, speed change is carried out when the values therefore are beyond the range surrounded by the $f', a', b', c',$ and $g'$ in the diagram.

The above-given conditions may also be satisfied beyond the range surrounded by the points $a', b'$ and $d'$, and the points $b', c'$ and $e'$, and therefore it can be used as speed change range.

Furthermore, one can effectuate the speed change beyond the range surrounding the points $d', b',$ and $e'$ without departing from the spirit of the present invention.

Figure 6C:
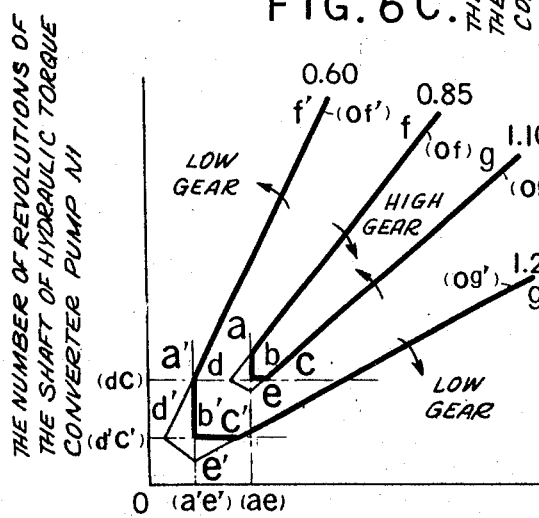

FIG. 6C is a diagram in which the speed change points (or lines) from low gear state into high gear state are represented by solid line, and the speed change points (or lines) from high gear state into low gear state are represented by a dotted line.

In this example, the speed change points (or lines) are shown by straight lines as in FIG. 6A, B, but it is sometimes preferable to use the speed change points (or lines) in the form of a curve, which is within the spirit of the present invention.

The electronic computing circuit for making speed change signals when speed change is carried out in accordance with the speed change points (or lines) shown in FIG. 6C is delineated in the following paragraphs.

V. ELECTRONIC COMPUTING CIRCUIT

The electronic computing circuit for determining the speed change point (or line) is composed of the hydraulic torque converter pump shaft 11, hydraulic torque converter turbine shaft 14, the computing circuits 310, 320 330 for computing the number of revolutions of the output shaft 56, four slip calculating counter circuits (410, 420, 430, 440), four computing circuits (340, 350, 360, 370), for determining the number of revolutions, two AND-circuits (510, 520), and OR-circuit (530), a bistable memorial circuit (540), the synchronous time retaining circuit (560), and two NOT-circuits (570, 610), and two gear position circuits (580, 590), as is shown in FIG. 7.

The expression "signal" which is referred to in the following paragraphs, stands for the direct current of positive polarity with the direct current of negative polarity being grounded, unless otherwise specified.

When the manual control lever is placed in D position, the electronic computing circuit is in condition for commencement of computation functions and the computing circuit is connected to a source of electricity (not shown) by means of the switch (not shown).

Referring to FIG. 7, the input introduced from line 311 into circuit 310 for computing the number of revolutions of the hydraulic torque converter pump shaft 11, is the output voltage $S_1$ of the detector 70 for detecting the number of revolutions of the hydraulic torque converter pump shaft 11, and the output signal designed as the electrical signal $[N_1]$ indicates the number of revolutions of the hydraulic torque converter pump shaft 11, said signal $[N_1]$ being led out through the line 312; the electric signal in the following description for showing the number of revolutions is bracketed as [ ].

The input introduced from line 321 into the computing circuit 320 for computing the number of revolutions of the hydraulic torque converter turbine shaft 14 is the output voltage $S_2$ of the detector 80 for detecting the number of revolutions of the hydraulic torque converter turbine shaft 14, and the output signal led out through line 322 from computing circuit 320, is the electric signal $[N_2]$ showing the number of revolutions of the hydraulic torque converter turbine shaft 14.

The input introduced from line 331 to the computing circuit 330 for computing the number of revolutions of the output shaft 56 is the output voltage $S_3$ of the detector 90 which detects the number of revolutions of the output a shaft 56, and the output signal thereof led out through line 332 of computing circuit 330 is the electric signal [$N_3$] showing the number of revolutions of the output shaft 56.

The input signal introduced from line 312 into the computing circuit 340 for determining the number of revolutions ([$N_1$]>1,200 r.p.m.) is [$N_1$], and the output signal from circuit 340 is the electric signal showing ([$N_1$]>1,200 r.p.m.), which is led out through the line 342.

In the same manner, the inputs of the computing circuit 350 for determining the number of revolutions ([$N_1$]<600 r.p.m.), the computing circuit 360 for determining the number of revolutions ($N_2$)>1,200 r.p.m.), and the computing circuit 370 for determining the number of revolutions ($N_2$)<600 r.p.m.) are respectively designated as [$N_1$], [$N_2$], [$N_3$], and are introduced from the lines 312, 322, and 332, and the outputs from the respective computing circuits 350, 360 and 370 are the electric signals showing ([$N_1$]>600 r.p.m.), ([$N_2$]>1,200 r.p.m.), and ([$N_2$]<600 r.p.m.) which are respectively led out through the lines 352, 362, 372.

[$N_2$] is a value obtained by computing [$N_3$] in the number of revolutions of the hydraulic torque converter turbine shaft 14.

The inputs of the slip computing circuit ([$N_2/N_1$]>0.85) 410 are two signals [$N_1$] and [$N_2$] and they are respectively introduced from the lines 312 and 322.

On the other hand, the output thereof is the signal (voltage) showing the result of computation of ([$N_2/N_1$]>0.85) and is led out through the line 412.

In the same manner, the inputs of the slip-computing circuits 420, 430, and 440 are two signal voltages [$N_1$] and [$N_2$] and are introduced from the lines 312 and 322.

The output signals thereof are the signals (voltage) which show respectively the results of the computation of ([$N_2/N_1$]<0.60) ([$N_2/N_1$]>1.20), ([$N_2/N_1$]<1.10), and are led out through the lines 422, 432, and 442 respectively.

The inputs of the AND-circuit A 510 are respectively the output signals of the computing circuit 340 for determining the number of revolutions ([$N_1$]>1,200 r.p.m.), the slip computing circuit ([$N_2/N_1$]>0.85) 410, the slip computing circuit ([$N_2/N_1$]<1.10) 440, the computing circuit 360 for determining the number of revolutions ([$N_2$]>1,200 r.p.m.), the signal of the low gear position 590 and the signal of the NOT-circuit B 570, and are respectively introduced from the lines 342, 412, 442, 362 and the lines 592, 572. The output signal thereof is the signal (voltage) for showing the result of the computation of AND circuit, and is led out through the line 512.

The inputs of the AND-circuit B 520 are the signals introduced through the lines 532, 542, 572, and the output signal (voltage) is led out through the line 522.

The inputs of the OR-circuit 530 are the signals (voltage) introduced through the lines 352, 422, 432, 372, and the output signal (voltage) is led out through the line 532.

The inputs of the bistable memorial circuit 540 are the signals (voltage) introduced through the lines 512 and 522, and the output signal (voltage) is led out through the line 542.

The input of the synchronous time retaining circuit 560 is the signal (voltage) introduced from the line 542, and the output signal (voltage) is led out through the line 562.

The input of the NOT-circuit A 610 is the signal (voltage) introduced from the line 542, and the output signal (voltage) is led out through the line 612.

The input of the NOT-circuit ratio 570 is the signal (voltage) introduced from the line and the output signal (voltage) is led out through the line 572.

The input signal of the high gear position 580 is the signal (voltage) introduced from the line 542. The input signal of the low gear position 590 is the signal (voltage) introduced from the line 612, and the output signal (voltage) thereof is led out through the line 592.

The line 542 is connected to the solenoid 280, and the output signal of the bistable memorial circuit 540 is introduced into the solenoid 280 through the line 542.

VI. THE COMPONENT CIRCUITS OF THE ELECTRONIC COMPUTING CIRCUIT

VI-A. COMPUTING CIRCUITRY

1 Computing circuit for computing the number of revolutions

The computing circuit 310 for computing the number of revolutions of the hydraulic torque converter pump shaft 11, the computing circuit 320 for computing the number of revolutions of the hydraulic torque converter turbine shaft 14, the computing circuit 330 for computing the number of revolutions of the output shaft 56 are the computing circuits for computing the number of revolutions by taking said signal (voltage) $S_1$, $S_2$, and $S_3$ as inputs respectively, and in regard to the structures thereof, the three are identical.

The structure of said computing circuit for computing the number of revolutions is delineated in FIG. 9 by referring to the computing circuit 310 for computing the number of revolutions of the hydraulic torque converter pump shaft 11 as an example.

The input signal (voltage) $S_1$ is introduced into the computing circuit 310 from line 311, and is amplified by means of the amplifier circuit 313, and the amplitude thereof is determined by the amplitude limiting circuit 314, and the alternating current voltage thereof is converted into direct current voltage with the frequency-DC voltage converting circuit 315 (composed of frequency demodulating rectifier circuit), and the voltage thereof is led out through the line 312.

The voltage wave is shown in FIG. 10 where
a. is the voltage wave of $S_1$, and after the amplification thereof, it takes the same wave.
b. is the output wave of the amplitude limiting circuit 314.
c. is the output wave of the frequency-DC voltage converting circuit 315, and the same comprises the wave of the output [$N_1$] of the computing circuit for computing the number of revolutions and shows that the computation of $N_1=S_1/n_1$ has been carried out.

When the constant of the time constant circuit composed of the resistance and condenser of the frequency demodulating circuit of the frequency-DC voltage converting circuit 315, is changed, the computation of the computing circuit 320 for computing the number of revolutions of the hydraulic torque converter turbine shaft and the computing circuit 330 for computing the number of revolutions of the output shaft, i.e. $N_2=S_2/n_2$, $N_3=S_3/n_3$ can be carried out.

2. Slip computing circuit

The output signals (voltage) [$N_1$] and [$N_2$] of the computing circuits 310 and 320 for computing the number of revolutions are introduced into the four kinds of slip computing circuits 410, 420, 430, and 440 by means of the lines 312, 322.

The structures of the computing circuits are the same.

Figure 11:
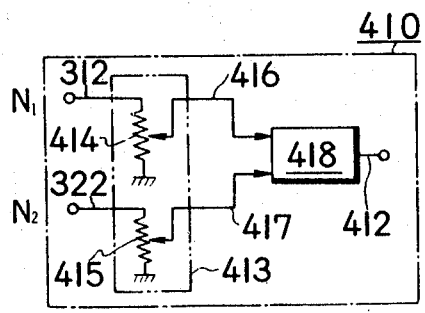
FIG. 11 is a block diagram showing the structure of the slip computing circuit thereof.

The structures of these slip computing circuits are explained in FIG. 11, by taking, as an example, the one in which slip computing circuit ([$N_2/N_1$]>0.85) 410, is electrically contrived.

The line 312 is connected to an end of potentiometer 414 while line 322 is connected to an end of potentiometer 415, the other ends of the respective potentiometer 414 and 415 being grounded.

The intermediate sliding taps 416, 417 of the potentiometers 414 and 415 are connected to the differential amplifier circuit 418 and the output signal thereof is led out line 412.

The computation of slip is the computation of [$N_2/N_1$]>0.85, and this means that the computation of [$N_2$]>0.85 [$N_1$], i.e., [$N_2$]−0.85[$N_1$]>0 has been effectuated.

The position of the signal [$N_1$] introduced from the line 312 is determined by the potentiometer 414 in such a manner that the output voltage of 0.85 [$N_1$] is led out on the intermediate sliding tap 416.

On the other hand, the position of the signal [$N_2$] (introduced from the line 322) is determined by the potentiometer 415 in such a manner that the signal $[N_2]$ becomes the voltage equal to $[N_2]$ on the intermediate sliding tap 417, and that is the position where the line 322 and the intermediate sliding tap 417 are connected.

When said two voltages are introduced into the differential amplifier circuit 418, the computation of the differences between two, i.e., $[N_2]-0.85[N_1]$, can be carried out, and when the result of the computation is in the positive, it is amplified and a determined voltage is led out on the line 412.

When the result of the computation is in the negative, voltage is not led out as an output even if it is amplified.

In other words, when voltage is generated, it shows $[N_2]-0.85[N_1]>0$, which means that $[N_2/N_1]>0.85$ was computed.

On the other hand, when it is $[N_2/N_1]<0.85$, the voltage is not led out as an output.

When $[N_2/N_1]<0.85$ is required, $[N_2]$ is introduced in line 312, and the intermediate sliding tap 416 is connected to the line 312, and $[N_1]$ is introduced in the line 322 and the intermediate sliding tap 417 is provided in such a manner that the signal voltage of 0.85 $[N_1]$ can be obtained thereon. Thus, $[N_2]-0.85[N_1]<0$, i.e., $[N_2/N_1]<0.85$ is computed.

By appropriately providing the potentiometers and by appropriately selecting intermediate sliding taps, it is also possible to carry out the computation of $[N_2/N_1]>1.20$ and $[N_2/N_1<0.60, [N_2/N_1<1.10$.

The output signals of the computing circuit are led out as the voltage, on the lines 412, 422, 432 and 442.

The slip ratio computation of the slip computing circuits 410, 420, 430, 440 can also be effectuated by oil pressure or mechanical means, and the examples thereof are given below.

A. Slip Ratio Computation By Means of Oil Pressure

Figure 24A:
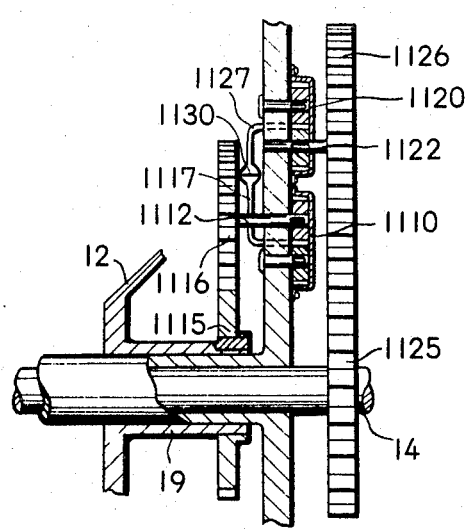
FIG. 24A is a cross-sectional view showing the slip computing means operable by means of oil pressure.

As is shown in FIG. 24A, the gear pumps 1110 and 1120 for exhausting pressurized oil in proportion to the number of revolutions of the drive side of said gear pump are installed on the housing 18 and a first gear pump 1110 is revolved by the shaft 1112, mounted for rotating on the housing 18, said shaft 1112 being driven by the gear 1116, and a second gear pump 1120 is revolved by the shaft 1122 which is rotatably mounted on the housing 18, and said shaft 1122 being driven by the gear 1126.

The pressurized oil exhausted by a first gear pump 1110 is supplied to the chamber below the differential pressure detector 1130 by means of the oil path 1117, and the pressurized oil exhausted by the second gear pump 1120 is supplied to the chamber above the differential pressure detector 1130 by means of the oil path 1127.

The gear ratio of the gear 1116 which is connected to the gear 1115 is 1:1, and the gear 1115 directly connected to the shaft 19 of the hydraulic torque converter pump which is connected to the input shaft 11 (not shown) also is connected at the gear ratio of 1:1; and the shaft 1112 of said gear 1116 is revolved at the number of revolutions of $N_1$ which is the same as the number of revolutions of the shaft 19 of the hydraulic torque converter pump.

The shaft 1112 as aforesaid drives the gear pump 1110 and when the exhausted oil pressure is set to be $P_1$, the following relation can be obtained.

$$P_1 = K N_1$$

(wherein $K$ is constant, and wherein the exhausted pressurized oil is sent to oil path 1117).

The gear pump 1110 sucks the hydraulic torque converter oil which is filled around said pump from the suction inlet (not shown).

The gear ratio of the gear 1125 which is directly connected to the shaft 14 of the hydraulic torque converter turbine and the gear 1126 which is in mesh with said gear 1125, is for example 0:6:1, and the shaft 1122 of said gear 1126 is revolved at the number of revolutions given by multiplying the number of revolutions $N_2$ of the shaft 14 of the hydraulic torque converter turbine by 1/0.6.

The shaft 1122 drives the gear pump 1120, and when the exhausted oil pressure is set to be $P_2$, the following relation can be obtained, $$P_2 = K N_2/0.6$$

(wherein $K$ is constant, and wherein the exhausted pressurized oil is sent to the oil path 1127).

The gear pump 1120 suck the hydraulic torque converter oil filled around the pump from the suction inlet (not shown).

The gear pumps 1110 and 1120 have the same structure and properties.

Figure 24B:
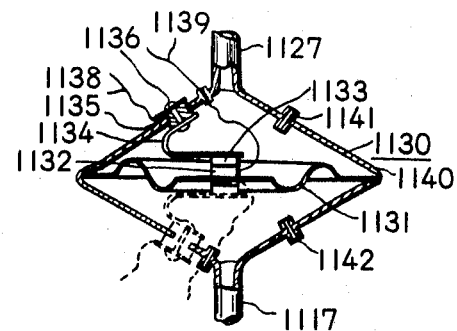
FIG. 24B is a partially enlarged view thereof.

The differential pressure detector 1130 is divided into two chambers by means of the diaphragm 1131 inserted within the casing 1140 as is shown in FIG. 24 B, and the upper chamber of the casing is connected to the oil path 1127, and the lower chamber of the casing is connected to the oil path 1117. The casing 1140 is provided with outlets 1141 and 1142, having the same fluidal resistance.

The diaphragm 1131 is provided with a contact 1132 at the center thereof, and said contact 1132 is electrically insulated from the casing 1140, and a conductor 1139 is connected thereto.

A fixed contact 1133 is provided in the casing 1140, and is fixed thereon by means of the arm 1134, an electric insulator 1135, and a metal tool fitting 1136, and is electrically insulated from the casing 1140.

A conductor 1138 is connected to the metal tool fitting 1136, and is electrically conductive with the fixed contact 1133.

When there is the relation of $P_1 \geq P_2$ between the exhausted oil pressures $P_1$, $P_2$ of the gear pumps 1110 and 1120, the contact 1132 and the fixed contact 1133 are contacted and become conductive.

In the case of $P_1 < P_2$, contacts 1132 and 1133 remain separated and do not become conductive.

When a differential pressure detector 1130 as above delineated is used, the conductors 1139 and 1138 become conductive when there is developed the relation $P_1 \geq P_2$, and therefore, when a positive potential is applied to the conductor 1339, the positive potential is generated on the conductor 1138, and the signal voltage of such positive potential can be obtained. In other words, when the above relationship is effectuated a positive potential signal is obtained and when there is a relation of $P_1 \geq P_2$ the following is derived from the above formula, viz $$K N_1 \geq K N_2 1/0.6$$
$$N_2/N_1 \leq 0.6$$

On the other hand, in the event of $N_2/N_1 > 0.6$ the signal voltage of the positive potential is eliminated, and this means that the computation of $N_2/N_1 \leq 0.6$ is carried out.

As is shown by the dotted line in FIG. 24 B, when the contacts are provided in the symmetrical positions against the diaphragm 1131, the positive voltage can be obtained on the conductor 1138 as the result of the calculation of $N_2/N_1 \geq 0.6$.

The above delineates the details as to the embodiment, in which the gear ratio of the gears are set to be 1:1 and 0.6:1 respectively. When the gears of the gear ratio 1:1 and 1:1 respectively are used, and when the fluidal resistance of the outlet 1141 of the differential pressure detector 1130 is made greater than that of the outlet 1142 to render the pressure of the upper and lower chamber respectively $P_2$, 0.6 $P_1$, (wherein $N_1 = N_2$), the contact 1132 and the fixed contact 1133 are contacted and rendered conductive when there is a relation of 0.6 $P_1 \geq P_2$.

In other words, when there are such relations as $P_1 = KN_1$, and $P_2 = KN_2$, the positive potential signal can be obtained on the conductor 1138 as a result of the computation of 0.6 $N_1 \geq N_2$, i.e., $0.6 \geq N_2/N_1$.

B. Slip Computation By Means of Mechanical Means

Figure 25A:
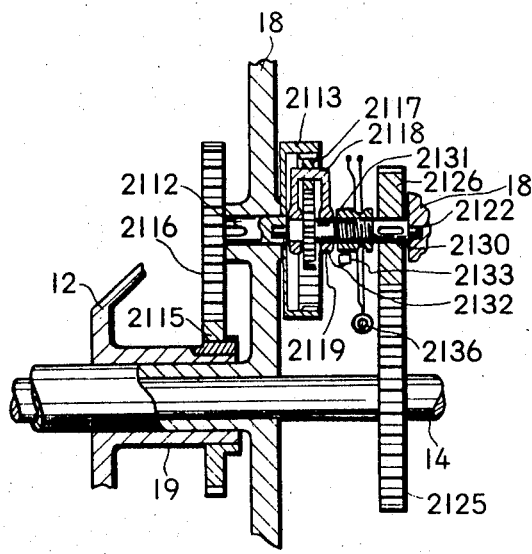
FIG. 25A is a cross-sectional view showing the slip computing means operable by means of mechanical devices.

In FIG. 25A, the gear ratio of the gear 2115 directly connected to the shaft 19 of the hydraulic torque converter pump connected to the input shaft 11 (not shown) at the gear ratio of 1:1 and the gear 2116 having the shaft 2112 rotatably inserted into the the housing 18 as is geared into the gear 2115, is 1:1, and the shaft 2112 of the gear 2116 is revolved at the same number of revolutions as the number of revolutions $N_1$ of the shaft 19 of the hydraulic torque converter pump.

The first sun gear (the internal gear) 2113 connected to the shaft 2112 is also revolved at the number of revolutions $N_1$.

The gear ratio of the gear 2125 directly connected to the shaft 14 of the hydraulic torque converter turbine, and the gear 2126 which meshes with gear 2125 and having the shaft 2122, one end of which is thereof rotatably inserted into the housing 18'; the other end thereof being rotatably inserted into the shaft 2112, is 0.6:1, for example, and the shaft 2122 of the gear 2126 is revolved, at the number of revolutions, i.e., 1/0.6 times the number of revolutions $N_2$ of the shaft 14 of the hydraulic torque converter turbine, i.e., at the number of revolutions $N_2/0.6$, and the second such gear 2123 directly connected to said shaft 2122 is also revolved at the number of revolutions $N_2/0.6$.

The planet gear 2117 which is geared in the first sun gear 2113 and the second sun gear 2123 which is united to said shaft 2122 is rotatably provided on the planet gear shaft 2118 which latter is rotatable with the shaft 2122 as the fulcrum.

In such a structure as above, when the number of revolutions $N_1$ of the first sun gear 2113 and the number of revolutions $N_2/0.6$ of the second sun gear 2123 are equal, the planet gear 2117 is not revolved, and the planet gear shaft 2118 is revolved at the number of revolutions $N_2/0.6$ which is the same as that of the shaft 2122.

On the other hand, in the case of $N_1<N_2/0.6$, the planet gear shaft 2118 is revolved at the smaller number of revolutions than the number of revolutions $N_2/0.6$ of the shaft 2122, and on the contrary in the case of $N_1>N_2/0.6$, planet gear shaft 2118 is revolved at larger number of revolutions than $N_2/0.6$.

The screw 2130 is provided on a part of the shaft 2122, and the nut 2131 is threaded thereon, and the boss 2119 of planet gear shaft 2118 is provided with the spring plate 2132, and at the end thereof, a frictionally contacting element 2133 is provided. The frictionally contacting element 2133 is frictionally contacted against the nut 2131, to revolve the nut 2131 at the same number of revolutions as that of the planet gear shaft 2118.

In such a structure as above, when the number of revolutions of the planet gear shaft 2118 is smaller than that of the shaft 2122, i.e., in the case of $N_1<N_2/0.6$ the nut 2131 is screwed up to the right, and on the contrary in the case of $N_1>N_2/0.6$ it is screwed to the left, and when $N_1=N_2/0.6$, the nut 2131 is not moved to the left nor right.

Figure 25B:
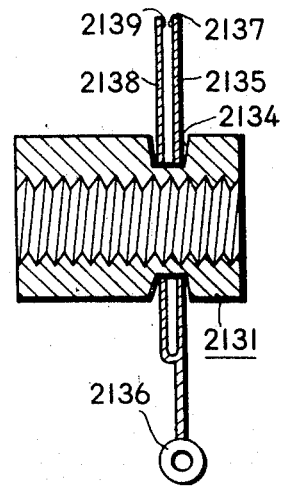
FIG. 25B is a partially enlarged view thereof.

The groove 2134 is provided on a part of the nut 2131 as is shown in FIG. 25B, and on said groove 2134 there is an arm 2135 which moves in accordance with the right and left movement of the nut 2131, and one end thereof is supported on the pin 2136 fixed on the housing 18 (not shown), and it can be revolved with said pin 2136 as the fulcrum, and at the same time it is made to be a support of large friction so that it can be moved only by the nut 2131.

The pin 2136 and the arm 2135 are electrically insulated.

On the other end of the arm 2135, the contact 2137 is provided.

The spring arm 2138 is provided on a part of the arm 2135, and is electrically insulated, and said spring arm 2138 is inserted into the groove 2134 of the nut 2131, and when the nut 2131 is moved to the right and left, the spring arm 2138 is bent as it is pushed by the nut 2131, and the contact 2139 provided on the end of the spring arm 2138 is contacted on the contact 2137, to move the arm 2135 to the right.

When the nut 2131 is stopped, the spring arm 2138 remains to be bent, and the arm 2135 remains as it is giving force to the spring arm 2138 to bend the same by the friction between the arm 2135 and the pin 2136.

When the nut 2131 is screwed up to the left, the arm 2135 remains as it is in the beginning, and the spring arm 2138 is moved to the left by the elasticity thereof and the connection between the contact 2137 and the contact 2139 is broken.

When the nut 2131 is screwed up further to the left, the arm 2135 is moved to the left.

However, the spring arm 2138 is also moved to the left, and therefore the contact of the contacts 2137 and 2139 is not brought about.

Thus, when the contact 2137 and 2139 are contacted, it is possible to send the positive potential signal from one to the other, and when they are separated, the positive potential signal is cancelled.

When the positive potential signal is obtained, the nut 2131 is moved to the right or stops, and as mentioned above this is the case in which the number of revolutions of the planet gear shaft 2118 is smaller than that of the shaft 2122, and this is the case in which there is the following relation:

$$N_1 \leqq N_2/0.6 \therefore N_2/N_1 \leqq 0.6$$

Therefore, the positive signal showing the result of the $N_2/N_{ao}<0.6$ can be obtained from the contact 2139.

3. Computing Circuit For Determining The Number of Revolutions

There are four computing circuits for determining the number of revolutions, i.e., 340, 350, 360, and 370.

These are the computing circuits for detecting whether or not the output signal is generated, depending on whether the input voltages $[N_1]$, $[N_3]$ are larger or smaller than the predetermined values, and the four computing circuits are composed of the same components.

Figure 12:
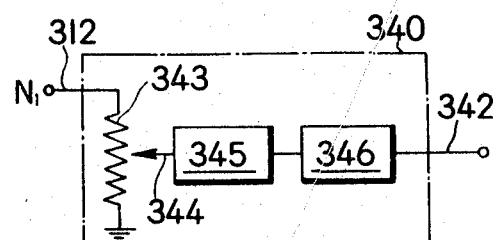
FIG. 12 is a block diagram showing the structure of the r.p.m. determining computing circuit thereof.

As an example of the structure of the computing circuit for determining the number of revolutions, the structure of the computing circuit 340, $([N_1]>1,200$ r.p.m.) is shown in FIG. 12.

The voltage $[N_1]$ showing the number of revolutions $N_1$ as the input, introduced through the line 312, is passed into the potentiometer 343, the intermediate sliding tap 344 of which is connected to the standard voltage diode 345 (which can conduct above the standard voltage), and since the diode 345 is connected to the amplifier circuit 346, the output is led out on the line 342.

The value of the voltage $[N_1]$ introduced into the potentiometer 343 is determined in such a manner that it can be divided into suitable other values through the medium of the intermediate sliding tap 344.

When the voltage of the intermediate sliding tap 344 is increased more than the standard voltage of diode 345, diode 345 sends a signal to the amplifier circuit 346, and said amplifier circuit 346 generates the voltage obtained by the amplification thereof.

On the contrary, when the standard voltage of diode 345 is higher than the voltage developed at the intermediate sliding tap 344, the output of the voltage signal $N_1$ above referred to is not led out on the line 342.

For example, in the circuit in which, when the intermediate sliding tap 344 of the potentiometer 343 is placed at the position where it is directly connected to the line 312, it is possible to generate the output signal (voltage) on the line 342 at 200 r.p.m., if the determination of $[N_1]>1,200$ r.p.m. is desired to be carried out, the intermediate sliding tap 344 is placed at the position 200/1,200 from the end of the earth to the effect that the output signal voltage can be sent from the line 342 only when $[N_1]$ is larger than 1,200 r.p.m.

On the other hand, in the case of $[N_1]>600$ r.p.m., it is possible to take out the output voltage of $[N_1]>600$ r.p.m. from the line 342 by placing the intermediate sliding tap 344 at the position 200/600 from the end of the earth.

Also it is possible to obtain the output signal (voltage) of $[N_1]<1,200$ r.p.m. by containing the phase reversing circuit in the amplifier circuit 346.

Thus it is possible to carry out the computation of $[N_1]>1,200$ r.p.m., $[N_1]<600$ r.p.m., $(N_2)>1,200$ r.p.m., and $(N_2)<600$ r.p.m.

The computation in computing circuits 340, 350, 360 and 370 for determining the number of revolutions can also be carried out by oil pressure or mechanical means as shown below.

A. Computation For Determining The Number of Revolutions By Means of Oil Pressure In the structure shown in FIG. 24A, the oil pressurized by the gear pump 1110 is sent to the conventional oil pressure electricity converting switch (not shown), and said switch is conducted when the oil pressure of said gear pump 1110 goes beyond predetermined constant pressure C, and the computation of $$C = P_1 \geq K\,N_1\,/0.6,\text{ i.e.,}$$
$$C \geq K'N_1,\text{ i.e.,}$$
$$C' \geq N_1$$

wherein C, C', K and K' are constant) is effectuated.

Therefore, when the oil pressure generating device of the same structure as that shown in FIG. 24A is used and the computation of $C' \geq N_1$ is carried out against any optionally chosen C' the positive potential output electric signal can be obtained.

On the other hand, when the oil pressure generating device in which the oil pressure-electricity converting switch is cut off under the conditions of $C' \geq N_1$, is used, the positive potential output electric signal can be obtained showing the result of computation of $C' \leq N_1$.

B. Computation For Determining The Number of Revolutions By Mechanical Means

It is possible to obtain the positive potential electric signal showing the result of the computation given below:

$$C \leq KN_2 \text{ (wherein } C \text{ is constant)}$$
$$\therefore c' \leq N_2 \text{ (wherein } C' \text{ is constant)}$$

by using the conventional mechanical means, in which the electric switch of the conventional centrifugal governor is revolved by the shaft 19 of the hydraulic torque converter pump is conducted when said centrifugal governor is revolved over a predetermined number of revolutions.

On the other hand, when the mechanical means in which the electric switch of the centrifugal governor is put off over a predetermined number of revolutions, it is possible to obtain the positive potential signal showing the result of the computation given below.

$$C'' = N_2 \text{ (wherein } C'' \text{ is a constant)}$$

VI–B Logic Circuitry

1. High Gear Position 580, Low Gear Position 590 NOT-Circuit A 610

It is necessary to know whether or not the vehicle is in the low gear state or in high gear state as the conditions of speed change.

The voltage applied to the solenoid 280, i.e., solenoid 280, is conductive and is introduced as the signal of the high gear position 580.

When voltage is applied to the solenoid 280, the voltage is erased by the NOT-circuit A 610 (this is a phase reversing circuit) and when a signal is introduced in said circuit A 610, voltage is not led out as an output; however, when voltage is not applied to the solenoid 280, the voltage is led out as an output signal.

The output signal voltage of the NOT-circuit A 610 is introduced as the signal of the low gear position 590.

2. Synchronous Time Retaining Circuit 560

A moment after the solenoid 280 is rendered conductive or after it is rendered nonconductive, the oil pressure operating circuit and the transmission carry out the speed change operation, and when another further speed change signal enters as an input at such time, the speed change operation cannot be carried out, and therefore it is necessary to retain the status quo until the speed change operation initiated by the first signal is completed.

Figure 13:
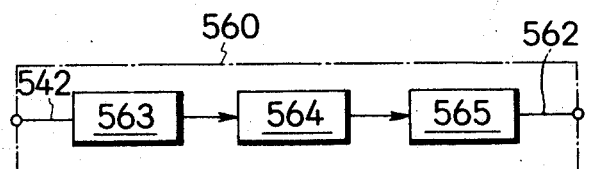
FIG. 13 is a block diagram showing the structure of the synchronous time-retaining circuit thereof.

In order to obtain such a signal, a synchronous time retaining circuit 560 composed of differential circuit 563, rectifier circuit 564, unstable multivibrator 565, an example of which is shown in FIG. 13, is employed.

Figure 14:
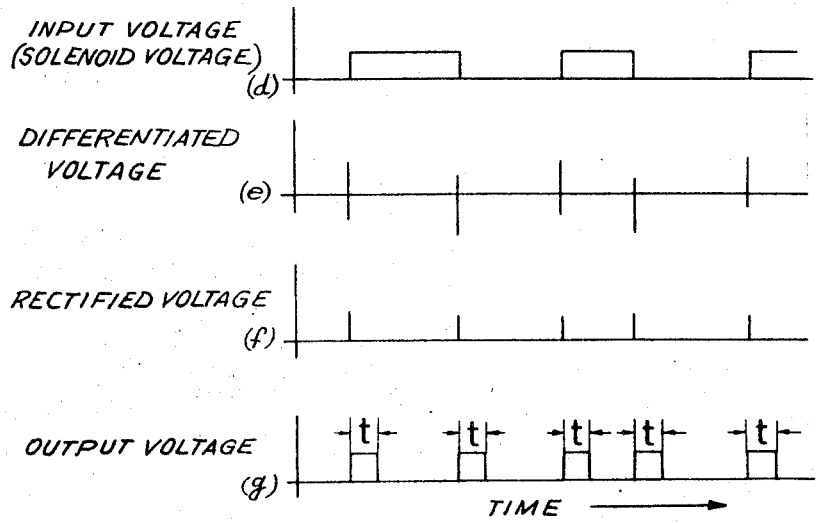
FIG. 14 is a diagram showing the operation voltage wave of the synchronous time-retaining circuit thereof.

In regard to the operation thereof, when the voltage applied to the solenoid 280 as is shown in FIG. 14 (d), is introduced through the line 542, it is acted upon by the differential circuit 563, as is shown in FIG. 14 (e), and signals are sent at the time of the change of conductivity to nonconductivity, or vice versa; the said signals being rectified by the rectifier circuit 564 as is shown in FIG. 14 (f).

The output signal maintainable for the time "$t$" is sent to the line 562 by introduction to unstable multivibrator 565 of said signal as is shown in FIG. 14 (g).

Said signal (voltage) continuing for the time $t$ is reversely driven from the NOT-circuit B 570 (composed of a phase reversing circuit) in such a manner that said signal is erased for the time $t$ sec. Thus the obtained reversed signal comes out on the line 572.

It is within the spirit of the invention to use a procedure to retain the synchronous time factor, so that after the solenoid is determined to be conductive or nonconductive, the completion of the speed change effectuated by the transmission may be obtained as an electric signal from the suitable portion of the oil pressure operating circuit or the transmission.

3. AND-circuit 3.1 AND-circuit A 510:

AND-circuit A 510 is a circuit which is generally called AND-circuit or "logic product" circuit, and generates output signal voltage on the line 512 when $[N_1] > 1{,}200$ r.p.m. signal of the computing circuit 340 for determining the number of revolutions, $[N_2/N_1] > 0.85$ signal of slip computing circuit 410, $[N_2/N_1] < 1.10$ signal of the slip computing circuit 440, $(N_2) > 1{,}200$ r.p.m. signal of the computing circuit 360 for determining the number of revolutions, the signal of low gear position 590, and the signal of the NOT-circuit B 570 are simultaneously all present.

3.2 AND-circuit B 520

AND-circuit B 520 is also a circuit which is generally called "AND-circuit" or "logic product" circuit, and generates the output signal voltage on the line 522 when the output signal of the OR-circuit 530, the signal of the high gear position 580, and the signal of the NOT-circuit B 570 are simultaneously all present.

4. OR-circuit 530

OR-circuit 530 is sometimes called logic sum circuit and generates the output signal (voltage) on the line 532 when at least one of the output signals of the computing circuit 350 for determining the number of revolutions, the output signal of the slip computing circuit 420, the output signal of slip computing circuit 430, and the output signal of the computing circuit 370 for determining the number of revolutions, is present.

5. Bistable memory circuit 540

Figure 15:
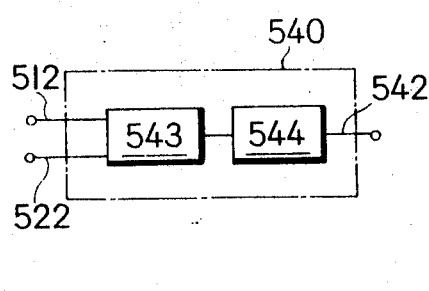
FIG. 15 is a block diagram showing the bistable memorial circuit thereof.

FIG. 15 shows the structure of the bistable memorial circuit 540.

Figure 16:
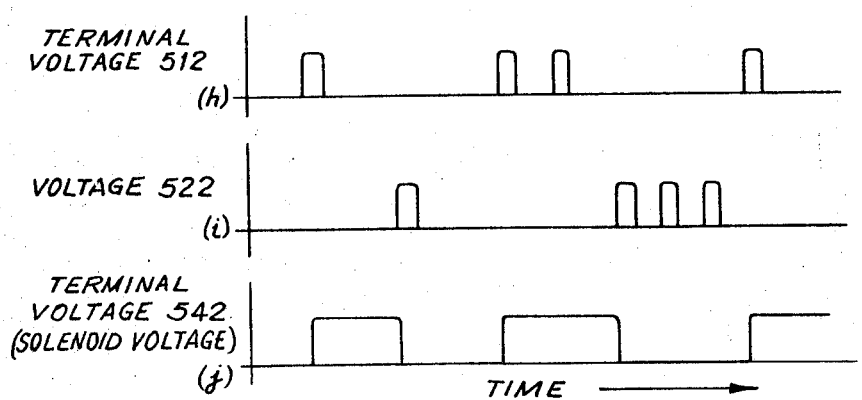
FIG. 16 is a diagram showing the operation voltage wave of the bistable memorial circuit thereof.

The lines 512 and 522 are connected to the input terminal of the bistable multivibrator 543, and when the signal voltage, as is shown in FIG. 16($h$), is generated on the line 512, the bistable multivibrator 543 becomes a stabilized state, and the output thereof is amplifier circuit 544, and the output voltage thereof comes out on the line 542, and the solenoid 280 is conducted. The output voltage thereof is shown in FIG. 16($j$).

When the input signal as is shown in FIG. 16($i$) is added into the line 522, bistable multivibrator 543 is stabilized in the reverse stabilized state, and the output thereof is amplified by the amplifier circuit 544, but the output voltage of the amplifier circuit 544 is erased (refer to FIG. 16($j$)).

Even if the input signal (voltage) should be erased after the input voltage is introduced into the line 512, for example, the state thereof can be retained and the solenoid 280 will still remain conductive.

When the signal (voltage) should again be led out from the line 512, the conductive state of the solenoid 280 can be retained (refer to the third input signal in FIG. 16($h$), and second signal in FIG. 16($j$)).

VII OPERATION OF THE ELECTRONIC COMPUTING CIRCUIT

1. Computation In Speed Change From Low Gear State Into High Gear State

In regard to the speed change from low gear state into high gear state, it is logically computed when it comes into the speed change range as is shown by the solid line in FIG. 6C, and the solenoid 280 is conductive, the valve shaft 272 of the shift valve is moved to the left, the oil pressure operation circuit is changed into the state of FIG. 4 from the state of FIG. 3 and the gear train 50 is changed from the low gear state into high gear state by the effect of the actuator.

In FIG. 17 through FIG. 22, the circuits where the signal voltage is present in the electronic computing circuit (FIG. 7) are shown by thick solid lines, and the circuits where the signal voltage is not present are shown by the dotted lines.

Figure 17:
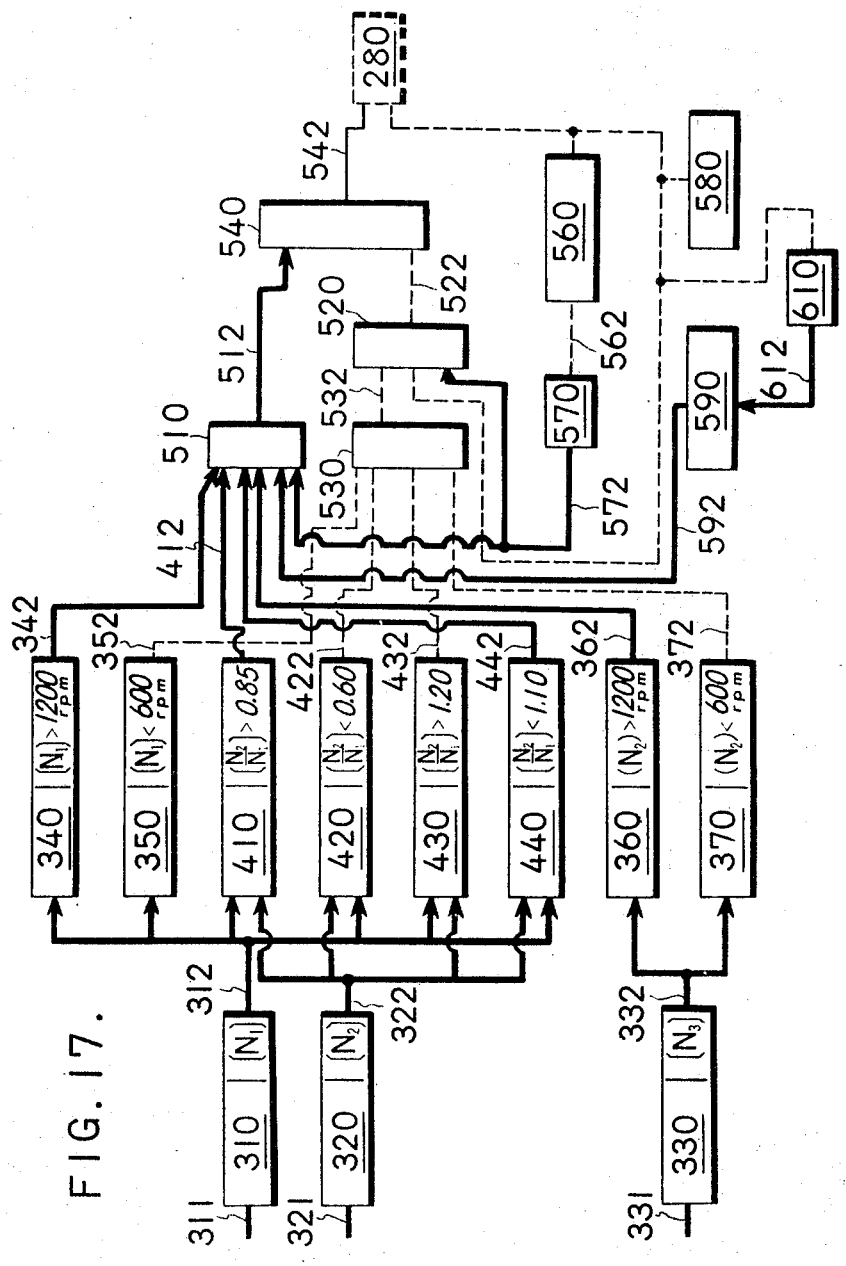
FIG. 17 is a block diagram showing the speed change computation thereof from the low gear state to high gear state.

As shown in FIG. 17, the solenoid 280 is not conductive until the speed change is effectuated, and therefore the signal of the NOT-circuit A 610, i.e., the signal of the low gear position 590 is present, and since there is no signal of the synchronous time retaining circuit 560, the output signal of the NOT-circuit B 570 is present, and these are transmitted to the AND-circuit A 510.

When the number of revolutions of the internal combustion engine are increased and the condition of $[N_1]>1,200$ r.p.m. is satisfactory, as the car speed is increased to satisfy the condition of $(N_2)>1,200$ r.p.m. and the slip ratio $[N_2/N_1]>0.85$ of the hydraulic torque converter is satisfactory (in this case $[N_2/N_1]<1.10$ is satisfactory), output signals are generated on the respective computing circuits. These signals are introduced into the AND-circuit A 150.

When all the inputs of the AND-circuit A 510 are present, the output signal thereof is generated and is introduced into the bistable memorial circuit 540.

Figure 18:
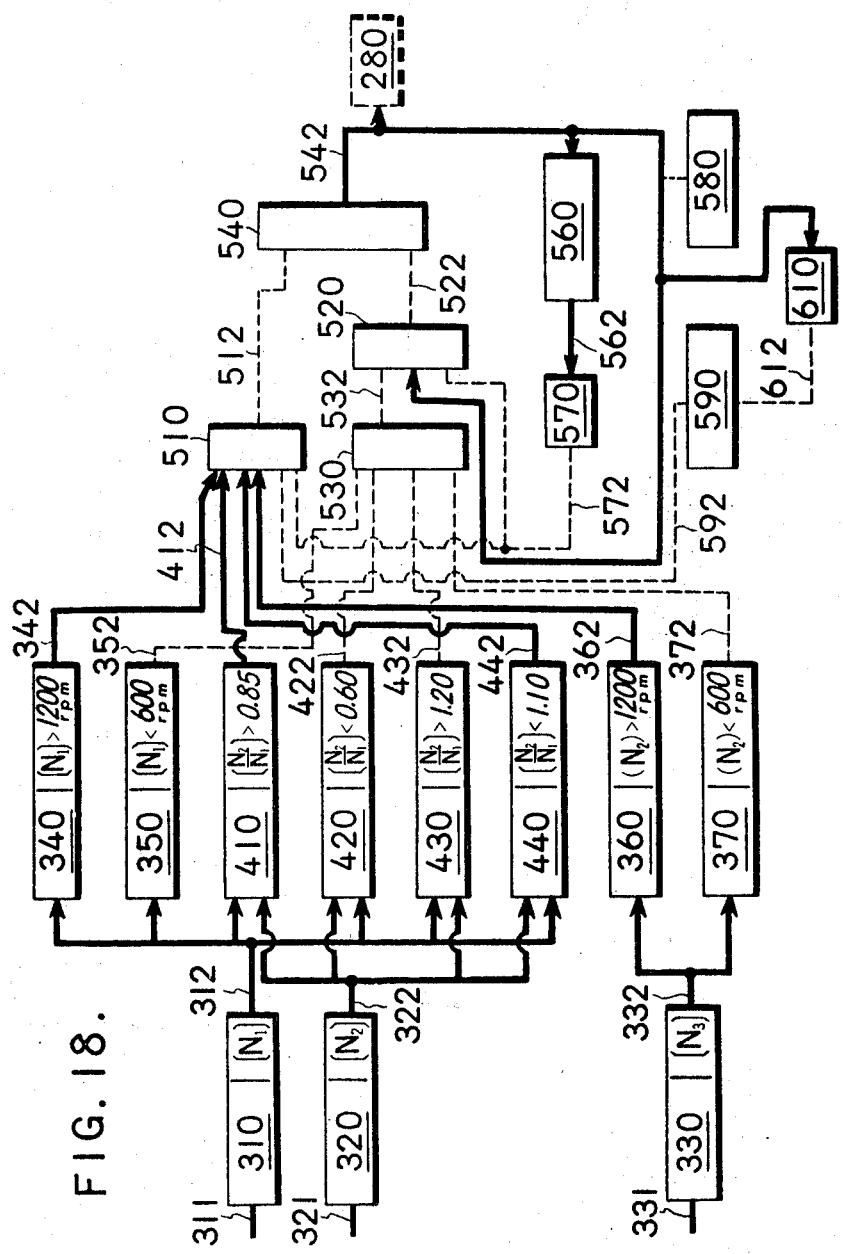
FIG. 18 is a block diagram showing the computation when the synchronous time-retaining signal is maintained after speed change is done from low gear state into high gear state.

When the signal is introduced into the bistable memorial circuit 540, it is memorized and stabilized on the conductive side of the solenoid 280, as shown at the right in FIG. 18, and at this time the solenoid 280 being conductive, the speed changing operation of the oil pressure operation circuit and the components of the transmission commences.

The fact that the solenoid 280 is conductive means voltage is applied, and the voltage enters the synchronous time retaining circuit 560 as a signal to generate the signal (voltage) for the time t sec. At that moment the NOT-circuit B 570 erases the then present signals.

On the other hand, the signal of the high gear position 580 is present by the applied voltage of the solenoid 280, and therefore the NOT circuit A 610 erases the signal of the then present low gear position 590.

Accordingly, the output signal of the AND-circuit A 510 is erased because two signals among the input signals thereof are not present.

However, the bistable memorial circuit 540 retains the given state, and the solenoid 280 therefore remains conductive.

Figure 19:
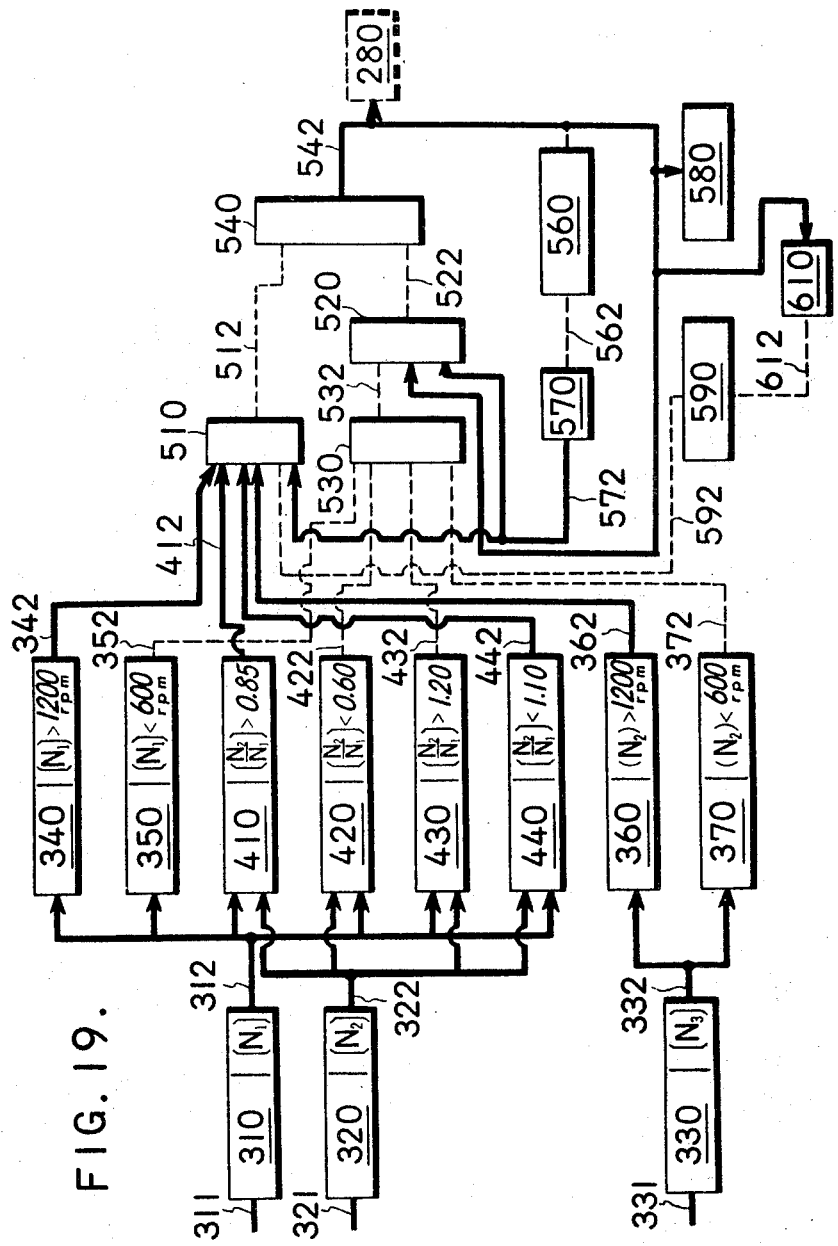
FIG. 19 is a block diagram showing the computation when the synchronous time-retaining signal is discontinued after the speed change from low gear state into high gear state.

The synchronous time retaining signal is erased in the time $t$ sec., as shown in FIG. 19, the output signal of the NOT-circuit B 570 is regenerated, said signal and the high gear position signal entering the AND-circuit B 520.

Such a state as shown in FIG. 19 is a modification of the state of logic computation in the electronic computing circuits during the running in the high gear state.

2. Computation In Speed Change From High Gear State Into Low Gear State

The speed change from high gear state into the low gear state can be carried out in such a manner that the logical computation is carried out when it goes out of the speed change range shown by the dotted line shown in FIG. 6C, and the conduction to the solenoid 280 is cut off, the valve shaft 272 of the shift valve is moved to the right, the oil pressure operation circuit is changed from the state shown in FIG. 4 into the state shown in FIG. 3, and the gear train 50 is changed from the high gear state into the low gear state by the effect of the actuator.

Figure 20:
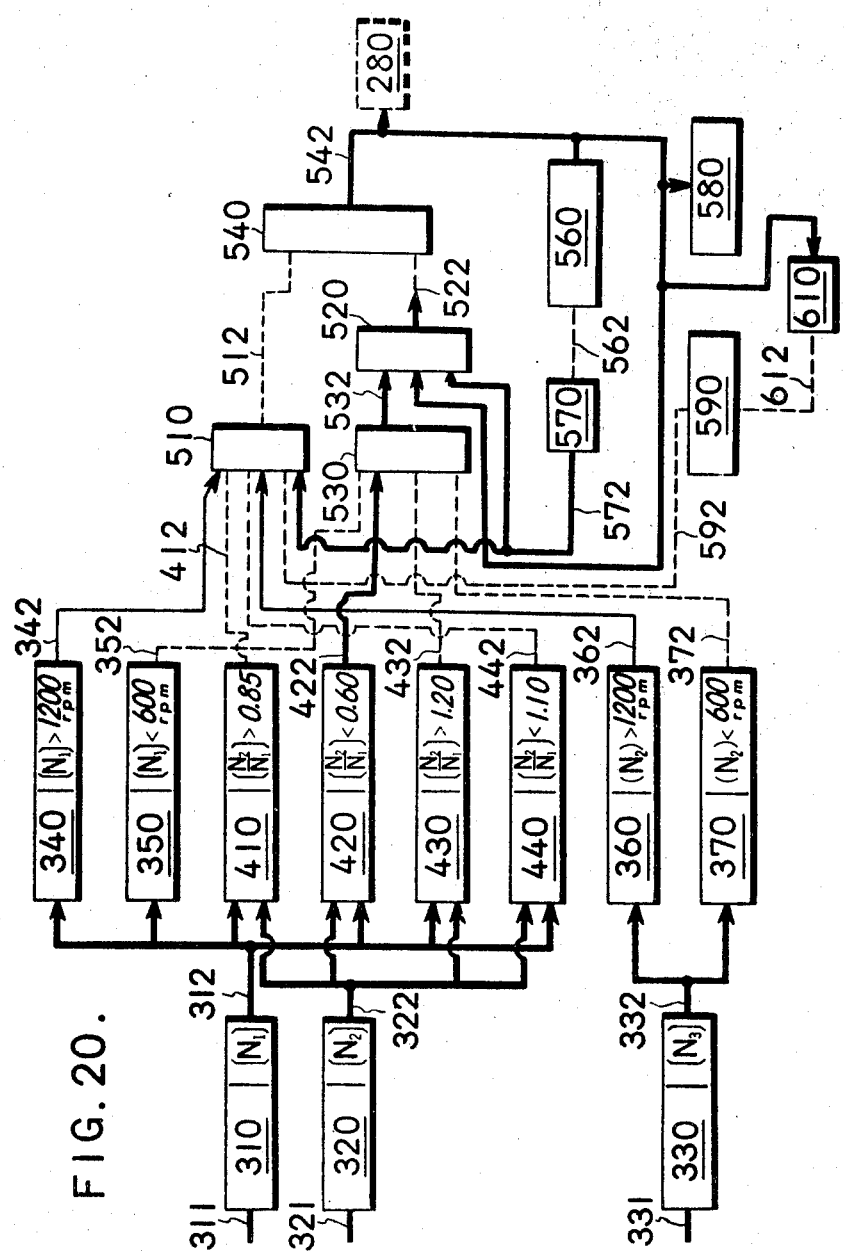
FIG. 20 is a block diagram showing the computation when the slip rate has become below 0.6 in the speed change from high gear state into low gear state.

As shown in FIG. 20, before speed change is carried out, should even one of the input signals of the AND-circuit A 510, such as the signals for determining the number of revolutions and slip signals be absent, the output signal of the AND-circuit A 510 is erased, but the solenoid 280 remains conductive.

However, the output signal of the NOT-circuit B 570 and the high gear position signal are introduced into the AND-circuit B 520. When the running state of a vehicle is changed, and the slip ratio goes below 0.6 for example, as shown in FIG. 20, the output signal of the slip computing circuit ($[N_2/N_1]<0.60$) 420 is led out, for entry into the OR-circuit 530 and the OR-circuit 530 introduces output signal thereof into the AND-circuit B 520, and since the inputs of the AND-circuit B 520 are all present, the output signal thereof is directly generated and is introduced into the bistable memorial circuit as is shown in FIG. 21, and it is there memorized and stabilized as it is reversed in the other stabilized state, the conductive function of the solenoid 280 is cut off at such time.

In this case, the synchronous time retaining circuit 560 generates the signal for the time $t$ sec., and therefore the NOT-circuit erases the then present signal on the line 572 and as well the high gear position signal is also erased, thereby erasing the output signal of the AND-circuit B 520.

Figure 22:
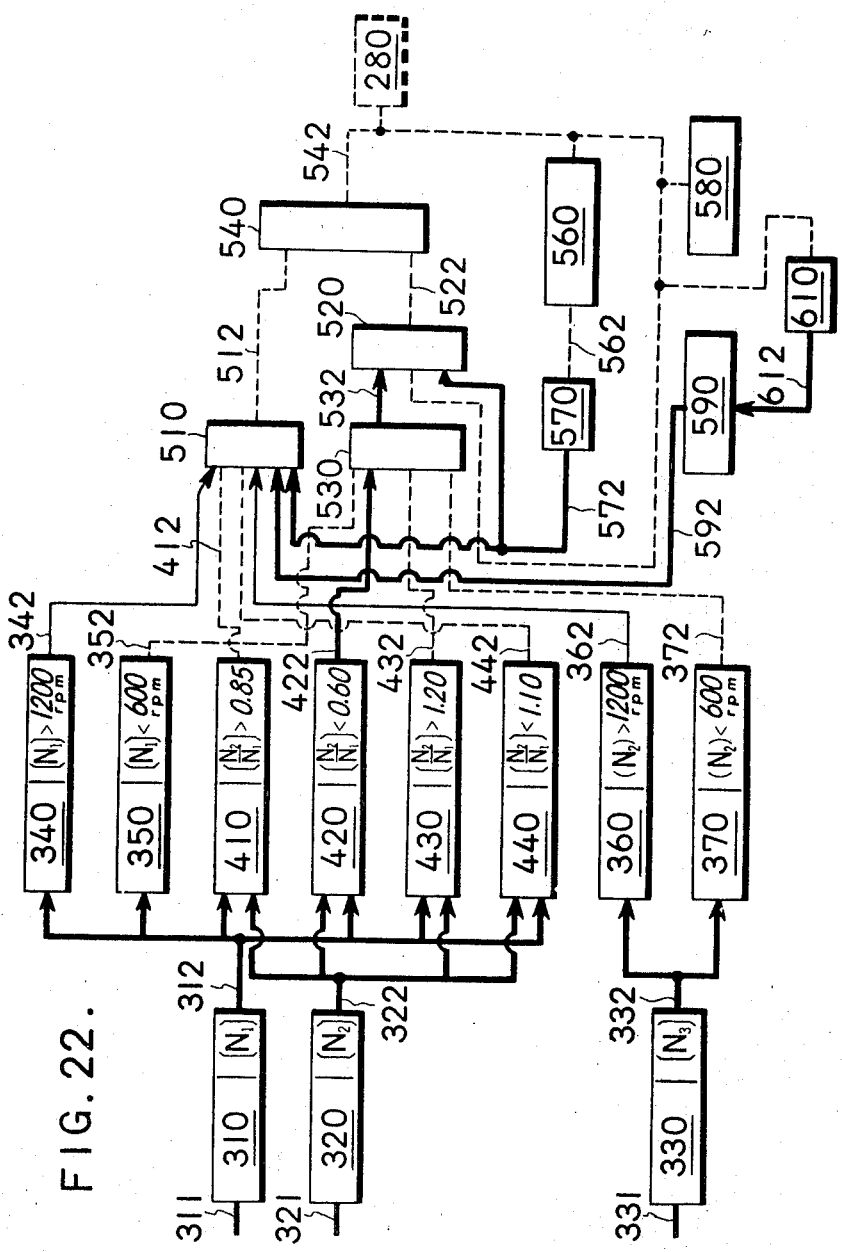
FIG. 22 is a block diagram showing the computation when the synchronous time-retaining signal is discontinued after the speed change from high gear state into low gear state.

The state in which the signal of the synchronous time retaining circuit 560 is erased in the time t sec. is a modification during the running of the vehicle the low gear state i.e., the state in which the signals of NOT-circuit B 570 and the low gear position 590 are introduced into the AND-circuit A 510, as shown in FIG. 22.

Figure 21:
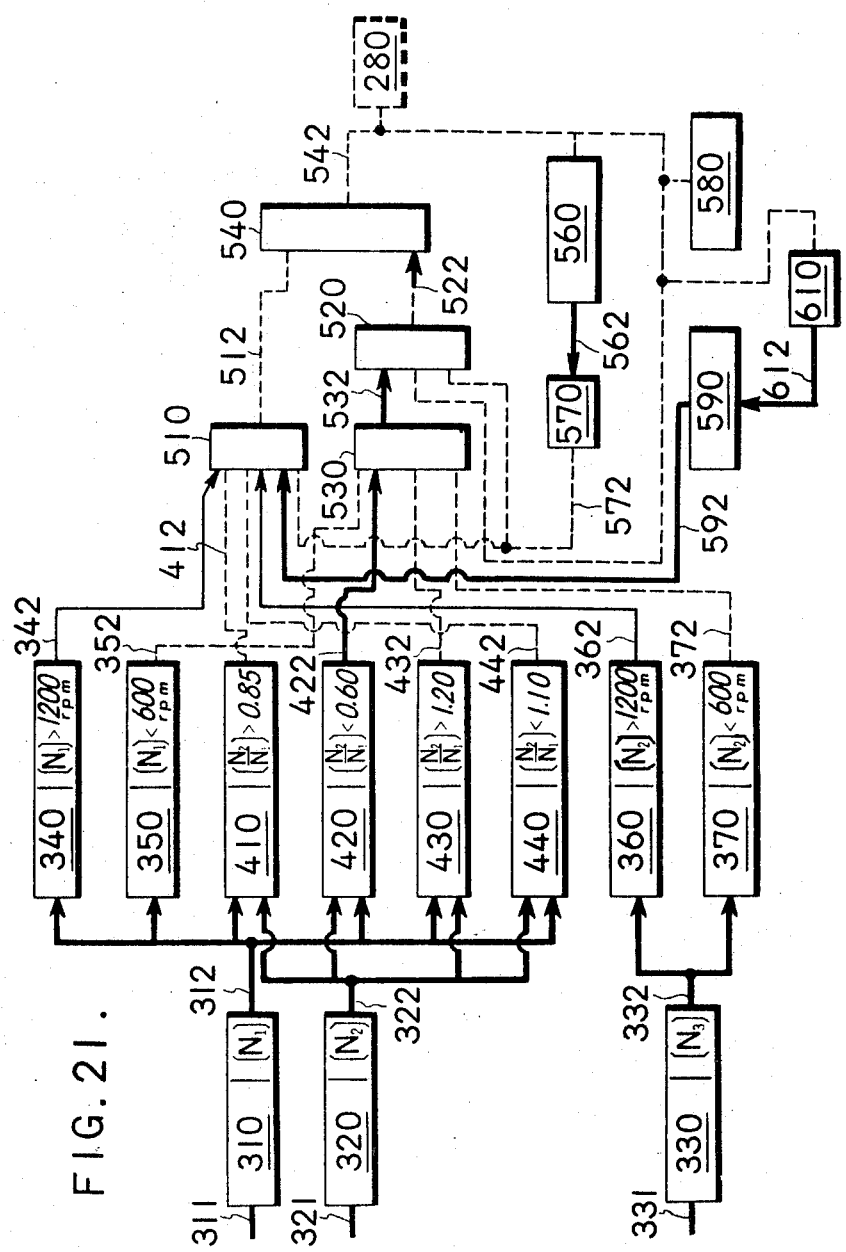
FIG. 21 is a block diagram showing the computation when the synchronous time-retaining signal is maintained after the speed change is completed from high gear state into low gear state.

In FIGS. 20–22, the signal for determining the number of revolutions ($[N_1]>1,200$ r.p.m. and the signal for determining the number of revolutions ($(N_2)>1,200$ r.p.m.) are shown in fine solid lines and since they have no relation to the above-mentioned operations, the explanations have therefore been omitted.

The above are the explanations about the case in which the signal of the slip calculation ($[N_2/N_1]<0.60$) is led out, and when at least one of the other signals such as the output signal of the slip computation ($[N_2/N_1]>1.20$) and the signals of computations for determining the number of revolutions ($[N_1]<600$ r.p.m.) and the number of revolutions ($(N_2)<600$ r.p.m. is generated, said signal enters the OR-circuit 530, and exactly the same computation as explained in FIGS. 20–22 is carried out, and the speed change from the high gear state into the low gear state can be carried out.

The above are the explanations concerning two-speed gear transmissions as the embodiment of the present invention, but in three-or-more speed gear transmissions, it can be easily determined from the above-given embodiment that speed change can be carried out from the low gear state into the high gear state, i.e., from first speed gear into the second speed gear, from the second gear into third gear, etc., and from high gear into low gear, i.e., from second gear into first gear, and from third gear into second gear, etc., by carrying out the computation of slip ratio, the computation for determining the number of revolutions of the internal combustion engine, and the computation for determining the number of revolutions showing the vehicle speed, and carrying out the logic computation for the conductive or nonconductive condition of the solenoid by the functions of these signals and by switching one or a plurality of shift values (the same as 270 or those having the similar function) with one or a plurality of solenoids (the same as 280 or those having the similar function).

VIII. OIL PRESSURE OPERATION CIRCUIT OF FORWARD THREE-SPEED AUTOMATIC TRANSMISSION

In the forward two-speed automatic transmission, as shown in FIG. 1, it is possible to make the forward three-speed transmission by providing the front brake 60 on the clutch drum 31 of the rear clutch 30.

When the front clutch 20, the rear clutch 30 and the rear brake 40, as shown in FIG. 1, and said front brake 60 are combined, and the combination is operated in such a manner as in the following table, the forward three speed gearing can be obtained.

TABLE

| Front Clutch | Rear Clutch | Front Brake | Rear Brake |
| --- | --- | --- | --- |

|                    | (20) | (30) | (60) | (40) |
|--------------------|------|------|------|------|
| Reverse (R)        | —    | on   | —    | on   |
| First stage (L) Forward | on | —  | —    | on   |
| Second stage (DL)  | on   | —    | on   | —    |
| Third stage (DH)   | on   | on   | —    | —    |

Figure 23:
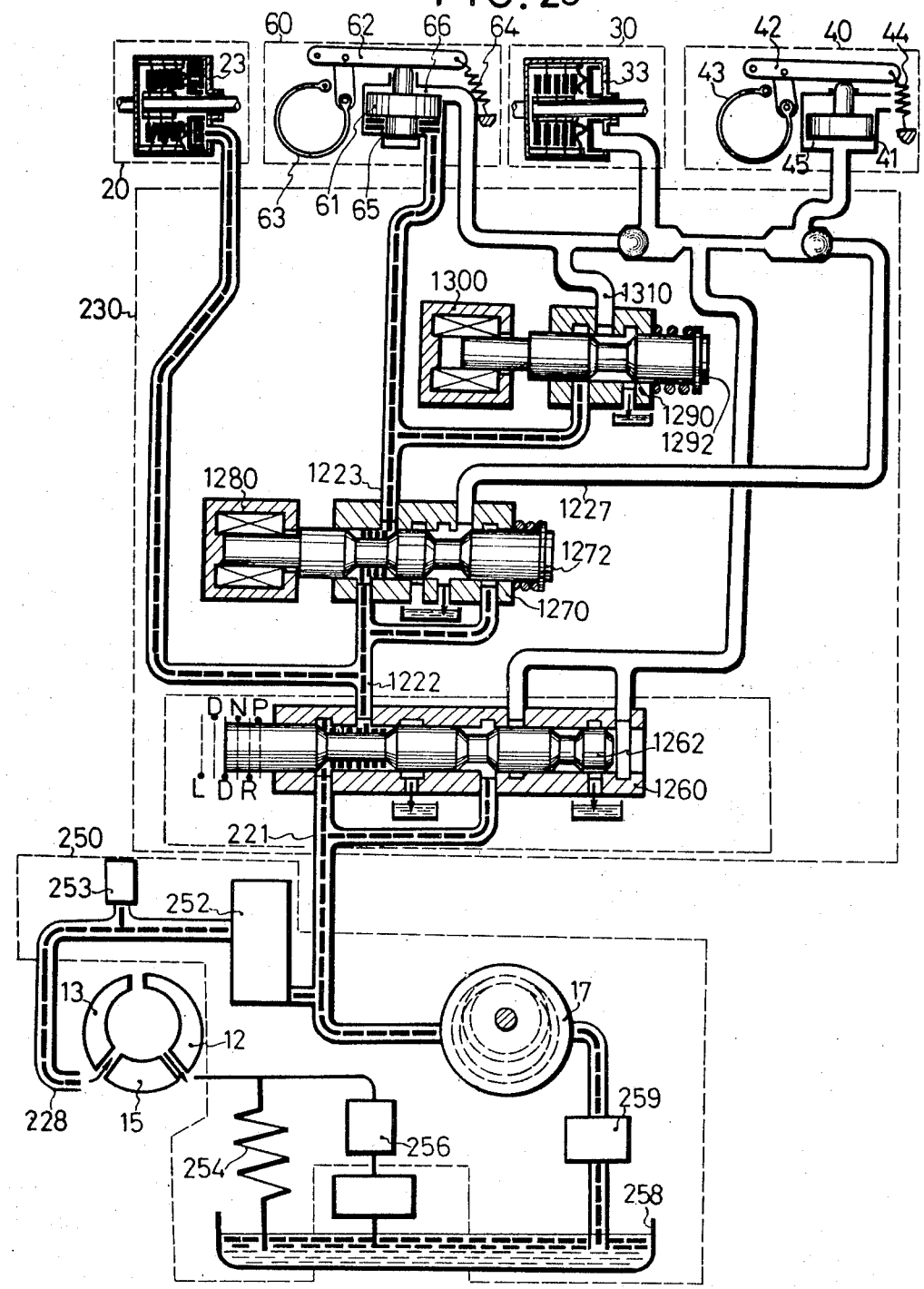
FIG. 23 is a diagram showing the operation of oil pressure operation circuit when this invention is applied to forward three-speed automatic transmission mechanism.

The oil pressure operation circuit used in the preceding transmission is shown in FIG. 23.

FIG. 23 shows the oil pressure arrangement of the second gear (DL), and the structures of the front clutch 20, the rear clutch 30, and the rear brake 40 are the same as those shown in FIG. 1 and FIG. 2, and the front brake 60 is composed of the brake piston 61, the brake link 62, the brake band 63, the return spring 64, the brake cylinder 65 and the release cylinder 66. When the operating oil pressure is given thereto the brake band 63 is operated to fix the second sun gear 57 of the gear train 50 at the position.

In FIG. 23, the oil path 221 to the manual valve 1260 is forked into two branches, and the oil path 1222 from said manual valve 1260 is forked into two branches, one of which is connected to the first shaft valve 1270, and the oil path 1223 from said first shift valve 1270 is forked into two branches, one of which is directly connected to the brake cylinder 65 of the front brake 60, and the other of which is connected to the second shift valve 1290, and the oil path 1310 from the second shift valve 1290 is connected to the rear clutch 30 and the cylinder 66 of the front brake 60.

The respective shift valves 1270 and 1290 are provided with the solenoid 1280 and 1300 on the valve shafts 1272 and 1292 thereof and the gearing of the forward first stage, the second stage, and the third stage can be a attained by the combinations of two solenoids given in the following table:

TABLE

|              | Solenoid 1280 | Solenoid 1300 |
|--------------|---------------|---------------|
| First stage  | —             | —             |
| Second stage | Conducted     | —             |
| Third stage  | Conducted     | Conducted     |

The valve shaft 1272 of the first shift valve 1270 is at the position in the left of the diagram by the conduction to the solenoid 1280, and the oil paths 1222 and 1223 are connected, and when the conduction is released, it is moved to the position in the right of the diagram, and the connection between the oil paths 1222 and 1223 is cut off, the oil paths 1222 and 1227 are connected.

When the second shift valve 1290 is at the position as shown in the diagram, the connection between the oil paths 1223 and 1310 is cut off, but when the solenoid 1300 is conductive the valve shaft 1292 is moved to the left, and the oil paths 1223 and 1310 are connected.

IX. SPEED CHANGE RANGE IN FORWARD THREE-SPEED AUTOMATIC TRANSMISSION

Figure 26B:
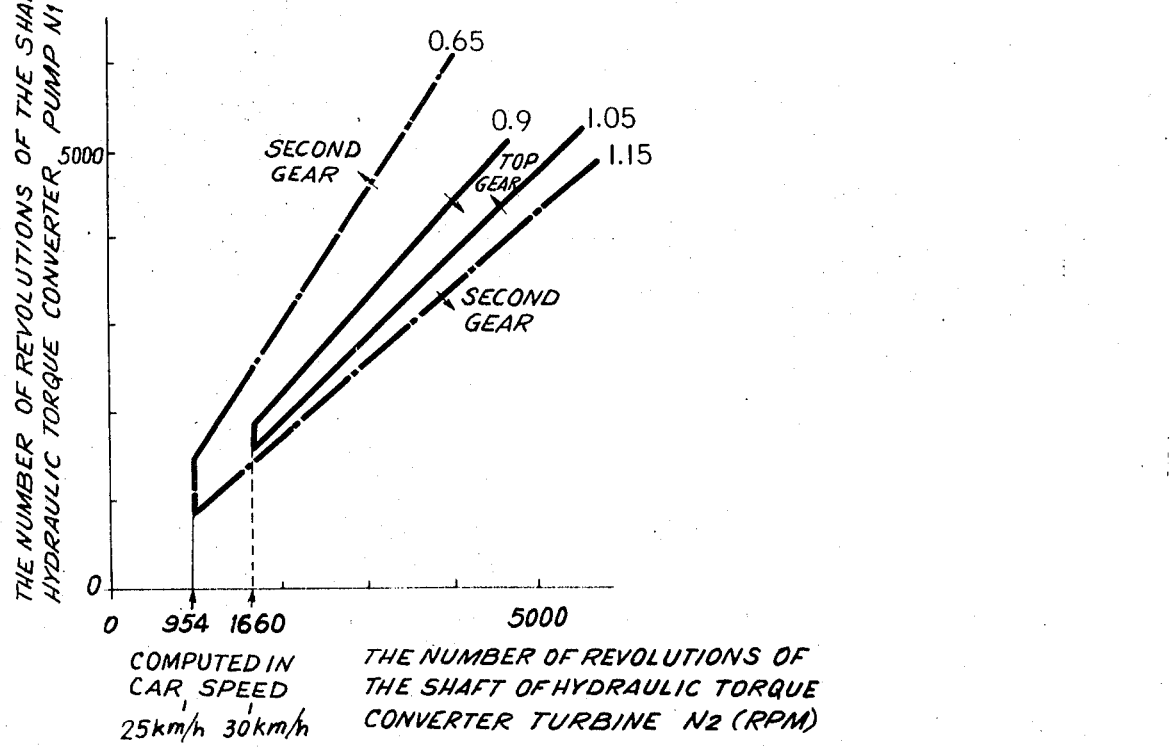

In regard to the speed change range when the automatic transmission of the present invention is applied to the forward three speed transmission, it is the same as in the case of the forward two speed automatic transmission, and there are involved (1) the control of the number of revolutions of the internal combustion engine, (2) the control of the car speed, and (3) the control of the slip ratio, but the respective concrete values are different from the earlier mentioned values, and an example obtained from the results of our experiments is given in the diagrams of FIG. 26A and FIG. 26B.

1. The Control Of The Number of Revolutions Of The Internal Combustion Engine

In order to carry out speed change from the low gear state (the first speed) into the second gear state (the second speed), the speed change point (line) of the number of revolutions of the engine (the number of revolutions of the shaft of the hydraulic torque converter pump) is about $N_1=1,100$ r.p.m. from the relation between the slip ratio and the vehicle speed.

When the speed change is carried out from the second gear (the second speed) state to the low gear (the first speed) state, the speed change point (line) of the number of revolutions of the engine (the number of revolutions of the shaft of the hydraulic torque converter pump) is $N_1=600$ r.p.m.

On the other hand, when speed change is carried out from the second gear (second speed) state to the top gear (third speed) state, and when the speed change is carried out from the top gear state to the second gear state (the case of FIG. 26B), the speed change points (lines) of the number of revolutions of the shaft of the hydraulic torque converter pump are respectively $N_1=1,600$ r.p.m. and $N_1=900$ r.p.m. from the relation between the slip ratio and the car speed.

2. Control Of The Vehicle Speed

When the speed change is carried out from low gear state into the second gear state, the adjustment of the acceleration may not be effectuated at will when the car is driven from low speed to the second gear state at too low speed, and therefore the speed change point (line) of the number of revolutions of the shaft of the hydraulic torque converter turbine is $N_2=1,402$ r.p.m. (15 km./h. as computed in vehicle speed).

On the contrary, when speed change is carried out from the second gear state into the low gear state, it is preferable that the vehicle speed be lower in view of the noise, and the speed change point (line) of the number of revolutions of the shaft of the hydraulic torque converter turbine is $N_2=552$ r.p.m. (10 km./h. as computed in vehicle speed).

On the other hand, in the speed change from the second gear state into the top gear state, the speed change point (line) of the number of revolutions of the shaft of hydraulic torque converter turbine is made to be $N_2=1,660$ r.p.m. (30 km./h. as computed in vehicle speed) and in the speed change from the top gear state into the second gear state, the speed change point (line) of the number of revolutions of the shaft of the hydraulic torque converter turbine is made to be $N_2=954$ r.p.m. (25 km./h. computed in vehicle speed).

3. Control Of The Slip Ratio

In the case of the ordinary cruising in which torque is transmitted to the output shaft 56 from the internal combustion engine by means of hydraulic torque converter, it is preferable to change speed within the range of the slip ratio from 0.5 to 1.0, and the slip ratio in the case of the speed change from the low gear state into the second gear state is preferably selected to be 0.85, and the slip ratio in the case of the speed change from the second gear state into the low gear state, is preferably selected to be 0.75.

On the other hand, the slip ratio in the case of the speed change from the second gear state into the top gear state, is selected to be 0.9, and the slip ratio in case of the speed change from the top gear state into the second gear state is selected to be 0.65.

When the torque is transmitted from the output shaft 56 to the internal combustion engine by means of hydraulic torque converter, the slip ratio is preferably within the range from 0.9 to 1.3, preferably at 1.0, it being requisite that the effect of the hydraulic torque converter should be presented in respect to the state of engine brake.

The slip ratio at the time of speed change from the low gear state into the second gear state is selected to be 1.25, and the slip ratio at the time of the speed change from the second gear state into the low gear state is selected to be 1.35.

On the other hand, the slip ratio at the time of speed change from the second gear state into the top gear state is selected to be 1.05, and the slip ratio at the time of speed change from the top gear state into the second gear state is selected to be 1.15.

Moreover, the structure of the electronic computing circuits in which the present invention is applied to the forward three-speed automatic transmission requires one more set of the solenoid, bistable memorial circuit, OR-circuit, and AND-circuit elements when compared with the case in which the present invention is applied to the forward two-speed automatic transmission, should be provided in respect of the signal for showing the top gear position, two additional computing circuits for determining the number of revolutions as well as four additional slip ratio computing circuits while one of such is removed, and in the following paragraphs, a brief explanation with respect to the structure and the effects of the embodiments in accordance with FIG. 27 through FIG. 39 are delineated.

X. COMPUTING CIRCUITS FOR FORWARD THREE SPEED AUTOMATIC TRANSMISSION

The structure of the computing circuits for determining the speed change point (or line) is delineated in FIg. 27, and is composed of computing circuits 310, 320, 330 for computing the number of revolutions of the shaft of hydraulic torque converter pump, the shaft of hydraulic torque converter turbine, and the output shaft, eight slip computing circuits (1410, 1420, 1430, 1440, 1450, 1460, 1470, 1480), five computing circuits (1340, 1350, 1360, 1370, 1380) for determining the number of revolutions, four AND-circuits (1510, 1520, 1610, 1620), two OR-circuits (1530 and 1630), two bistable memorial circuits (1540, 1640), the synchronous time retaining circuit (1710), the NOT-circuit (1720), three gear position determining circuits (1820, 1830, 1840), and the speed change gear position logic circuit (1810).

Figure 8B:
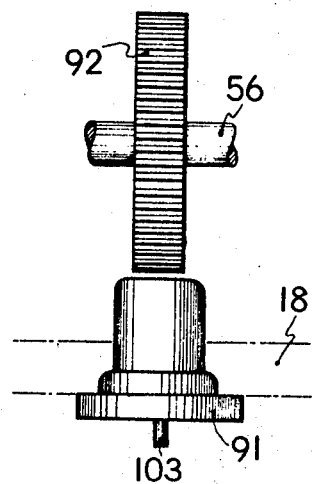

The respective components are exactly the same as in the case in which the present invention is applied to the forward two speed automatic transmission and the computing circuits (310, 320, 330) for computing the number of revolutions of the shaft of the hydraulic torque converter pump, the shaft of the hydraulic torque converter turbine and the output shaft, are electric circuits for converting the input of the combination of the toothed disc 92 and the coil 102 wound on the permanent magnet 101 as is shown in FIG. 8, into voltage but using frequency-DC voltage converting circuit shown in FIG. 9, but, as is shown in FIG. 24, they may be replaced by the means of oil pressure, in the combination of the gear pump 1110, and the differential pressure detector 1130 as shown in FIG. 24, or by mechanical means, in which the governor and the contacts are used, or planet gear 2118, the nut 2131, the contacts 2137 and 2139 are used as shown in FIG. 25.

On the other hand, the circuits 1340, 1350, 1360, 1370 and 1380 for determining the number of revolutions are composed of potentiometer 343, the standard voltage diode 345, the amplifier circuit 346, as is shown in FIG. 12, and the slip ratio computing circuits 1410, 1420, 1430, 1440, 1450, 1460, 1470, 1480, all of which are associated with potentiometers 414, 415 and differential amplifier circuit 418, as is shown in fIG. 11; it also being possible however to use any of electric, oil pressure and mechanical means for the same purpose as the above circuits.

The four AND-circuits 1510, 1520, 1610 and 1620 may be of construction wherein transistors are serially and conventionally connected to the input circuit, and the two OR-circuits 1530, 1630 may be constructed wherein transistors may be parallelly and conventionally connected to the input circuits.

The two bistable memorial circuits 1540, 1640 as utilized are the circuits operable by means of bistable multivibrator 543 and the amplifier circuit 544 as is shown in FIG. 15 in the embodiment in which the present invention is applied to the forward two speed automatic transmission.

As disclosed in FIG. 13 and 14, the synchronous time retaining circuit 1710 is composed of the differential circuit 563 for differentiating the rectangular wave form input voltage (solenoid voltage) (d) into differential voltage (e) the rectifier circuit 564 for obtaining the rectifier voltage (f) by rectifying the wave form, and the unstable multivibrator 565 for generating the output voltage (g) retained for the time of $t$ sec., and the difference in FIG. 14 over the circuit shown in FIG. 13 is that two differential circuits are present on the input side.

The NOT-circuit 1720 is composed of the phase reversing circuit using one stage amplifier circuit as is generally known to those in the art.

The speed change gear position logic circuit 1810 is composed of the NOT-circuits 1815, 1816, and the AND-circuit 1817, for example, as is shown in FIG. 40, and when the solenoid A 1280 and the solenoid B 1300 are not conductive, the output signal is generated on the line 1812 as shown in FIG. 40, the low gear signal being generated on the line 1842 from the low gear position 1840.

On the other hand, when the solenoid A 1280 is conductive, and the solenoid B 1300 is not conductive, the output signal is generated on the line 1813, and when the signal is generated on the line 1813, the second gear position signal is generated on the line 1832 from the second gear position 1830, and when the solenoid A 1280 and the solenoid B 1300 are both conductive, the output signal is generated on the line 1814.

The top gear position signal is generated on the line 1822 from the top gear position 1820.

The data with respect to the activity of the respective solenoids A 1280 and B 1300 are outlined in the following table:

TABLE A

|  | Solenoid A 1280 | Solenoid B 1300 |
|---|---|---|
| Low-gear position signal | Not conductive | Not conductive |
| Second gear position signal | Conductive | Not conductive |
| Top gear position signal | Conductive | Conductive |

XI. OPERATION OF THE ELECTRONIC COMPUTING CIRCUIT

1. Computation In Speed Change From Low Gear State Into Second Gear State

The speed change from low gear state into the second gear state can be carried out in such a manner that when the state of hydraulic torque converter enters inside the speed change range as is introduced shown by the solid line in FIG. 26A, the signal is from the AND-circuit A 1510 into, the bistable memorial circuit 1540 through the line 1512 as is shown in FIG. 28, and when the solenoid 1280 is conductive as is shown in FIG. 29, the shift valve shaft 1272 shown in FIG. 23 is moved to the left, and the front clutch 20 and the front brake 60 are operated, and the state of gear train 50 is changed from the low gear state into the second gear state.

In FIG. 28 through FIG. 39, the circuits in which the signal voltage is present in the electronic computing circuits shown in FIG. 27 are shown by thick solid line, and the circuits in which signal voltage is not present are shown by the dotted line.

As is shown in FIG. 29, immediately after the solenoid 1280 becomes conductive, the second gear position signal is generated by the speed change gear position logic circuit 1810 and the second gear position 1830 has introduced therein the signal from the line 1542, which is then led out to the AND-circuits B and C, 1520 and 1610.

On the other hand, if signal voltage is first introduced into the synchronous time retaining circuit 1710 through the line 1542, and a further signal is introduced into the NOT-circuit 1720 from the line 1712 for the time of t sec., the signal therefore from the NOT-circuit 1720 is not introduced into the line 1722, and one of the signals introduced in the AND-circuit A 1510, is erased, and accordingly the signal is not introduced into the bistable memorial circuit A 1540, but by means of the memory effect of said circuit A 1540 as the first introduced signal, the solenoid 1280 is maintained as conductive.

A signal is introduced into either of other AND-circuits B, C, D (1520, 1610, 1620) from said NOT-circuit 1720, and therefore even if other signals such as slip ratio signals should be generated for the time of $t$ sec., there is no possibility that other speed change operation may be started until after the expiration of its time $t$ sec.

As is shown in FIG. 30, when the signal of the synchronous time retaining circuit 1710 is erased after the time of $t$ sec. has passed, the signal is not introduced in the NOT-circuit 1720 from the line 1712 and the signal from said NOT-circuit 1720 is introduced in the circuits A, B, C and D (1510, 1520, 1610, 1620) through the line 1722.

2. Computation In Speed Change From Second Gear State Into Low Gear State

In this case when the state of the hydraulic torque converter is beyond the speed change range as is shown by the dotted line in FIG. 26A, or in other words, the slip ration $[N_2/N_1]$ becomes smaller than 0.75, a signal is generated on the line 1532 from the OR-circuit A 1530, and thereby all input signals of the AND-circuit B 1520 are present to generate the signal from said AND-circuit B 1520 on the line 1522, and the output signal of the bistable memorial circuit A 1540 is erased, and thus conductivity of the solenoid 1280 cut off, and the state of the vehicle is the low gear state, as shown in FIG. 31.

Immediately thereafter the signal of the synchronous time retaining circuit 1710 is generated for the time of t sec., and the signal of the NOT-circuit 1720 is erased, and as mentioned above another speed change operation cannot be initiated or carried out, until the time of t sec. has elapsed, as is shown in FIG. 32.

On the other hand, when the signal on the line 1542 from the bistable memorial circuit 1540 is erased the speed change gear position logic circuit 1810 and the low gear position 1840 are operative, and the low gear position signal is introduced into the AND-circuit A 1510.

After the time of t sec., the signal from the NOT-circuit 1720 is introduced into the AND-circuits A, B, C, D (1510, 1520, 1610, 1620) as is shown in FIG. 33.

3. Computation In Speed Change From The Second Gear Stage Into The Top Gear State In this case, when the state of hydraulic torque converter enters the speed change range as is shown by the solid line in FIG. 26B, computation can be carried out, and the solenoids 1280 and 1300 are conductive, and such a state as this is generated when the $[N_2/N_1]>0.9$ signal and $[N_2/N_1]<1.05$ signal of the slip-computing circuits 1420 and 1460, $(N_2)>$ 1,660 r.p.m. signal of the computing circuit 1380 for determining the number of revolutions, the signal from the NOT-circuit 1720, and the signal from the second gear position 1830 are all given to the AND-circuit 1610, as is shown in FIG. 34.

Immediately after the speed change into the top gear state, the top gear position signal is generated by the effect of the top gear position 1820 and the speed change gear position logic circuit 1810 by the signal from the lines 1542 and 1642 connected to the solenoids 1280 and 1300, and the signal is introduced into the AND-circuit D 1620 through the line 1822, as is shown in FIG. 35.

On the other hand, immediately after the speed change into the top gear state, the signal of the NOT-circuit 1720 is erased for the time of $t$ sec., as is shown FIG. 35, by the signal of the synchronous time retaining circuit 1710, and after the time of $t$ sec., the signal of the NOT-circuit 1720 is introduced in the AND-circuits A, B, C, D (1510, 1520, 1610, 1620) through the line 1722 as is shown in FIG. 36.

4. Computation In Speed Change From The Top Gear State Into the Second Gear State When the slip ratio $[N_2/N_1]$ becomes smaller than 0.65, for example, the signal is generated from the slip computing circuit 1480, as is shown in FIG. 37, and it is introduced in the OR-circuit B 1630 through the line 1482, and therefore the signal of the OR-circuit is introduced to the AND-circuit D 1620 through the line 1632 in addition to the signal of NOT-circuit 1720 and the signal of top gear position 1820 which has already been transmitted thereto are all present in the AND-circuit D 1620, and the signal thereof is generated on the line 1622.

Thereby, as is shown in FIG. 38, the signal of the bistable memorial circuit B 1640 is erased, and the conductivity of the solenoid 1300 is cut off. On the other hand, the solenoid 1280 becomes conductive, and therefore the speed change is carried out into the second gear.

Immediately after the speed change, the speed change gear position logic circuit 1810 and the second gear position 1830 are operated by the signal from the solenoid 1280 through the line 1542 and the second gear position signal is introduced in the AND-circuits B, C (1520, 1610).

On the other hand, the signal of the synchronous time retaining circuit 1710 through the line 1642 from the solenoid 1300 is erased, and the signal from the NOT-circuit 1720 is erased for the time of $t$ sec., and after the time of $t$ sec. has passed, the signal of the NOT-circuit 1720 is generated again since the signal of the synchronous time retaining circuit 1710 has been erased, as is shown in FIG. 39, and the signal is introduced in the AND-circuits A, B, C and D (1510, 1520, 1610, 1620) through the line 1722.

In the foregoing explanations, electric signals from the computing circuits for determining the number of revolutions and the slip computing circuits are given to the AND-circuits, but it is within the spirit of the present invention to carry out speed change by introducing into the AND-circuits electric signals in accordance with the state of load of the internal combustion engine (negative pressure in the intake manifold and opening of the throttle valve) and the number of revolutions of the internal combustion engine.

When it is not necessary to provide speed change operation with hysteresis so as to differentiate the speed change point to the lower gear position and the speed change point to upper gear position, only one AND-circuit is required in the logic circuit, and therefore the OR-circuit and bistable memorial circuit may not be required, and thus the utilization of an automatic transmission having an electrically controlling device composed of one AND-circuit, a gear position signal generating means, and the synchronous time retaining means, is not against the spirit of the present invention.

Moreover, even if it is assumed that hysteresis may be required in the speed change operations, and when it is not necessary to carry out speed change at the time when the slip ratio of the input shaft of the transmission with hydraulic torque converter and the input shaft of the gear transmission mechanism of said transmission is smaller than a predetermined value, it is sufficient to satisfy the condition that the electric signal entering the electric controlling device is larger or smaller than a predetermined value, and it is not necessary to be within a certain range, and therefore OR-circuit may not be required, and the automatic transmission having the electrically controlling device composed of two AND-circuits, a bistable memorial circuit, a synchronous time retaining circuit, the gear position signal generating means, would be within the spirit of the present invention.

XII. EFFECTS

The summary of the effects of the present invention is as follows:

1. In accordance with the present invention, the slip ratio of the hydraulic torque converter, the number of revolutions of the internal combustion engine, and the number of revolutions corresponding to the vehicle speed, are computed by electronic computing circuit to detect the speed change range and for determining the speed change point, and therefore it is possible to carry out the speed change by utilizing the efficiency of the internal combustion engine, the running state of the vehicle, and the efficiency of the hydraulic torque converter, and thereby it is possible to obtain the advantages of improvements in the speed change efficiency including but not limited to the realization of automatic speed change in engine brake state and in the various gear positions.

2. Electronic computing circuitry computes the speed change condition signals in the form of logic product and logic sum values, and therefore stabilized speed change signals may readily be obtained, it being possible to retain either one of the two states by utilizing the bistable memorial circuit during the time after one signal is introduced in such circuit until the other signal is given to said circuit after "$t$" seconds.

3. Even the slip ratio, which is a part of the speed change conditions, if it is changed during the time of "$t$" seconds, after a first speed change, by the utilization of the synchronous time retaining circuit, if and as other signals for further speed changes should be added to the AND-circuit and OR-circuit, such further speed change or changes may not be effectuated at another gear position, until the elapse of a period of "$t$" seconds.

What is claimed is:

1. In a variable speed automatic transmission for a vehicle having an engine having an output shaft, a gear unit providing a plurality of different speed gear ratio drives and having and output shaft, a hydraulic torque converter having input and output interposed therebetween, friction engaging means including fluid-actuated motors which complete the respective gear ratio drives, a source of fluid under pressure, delivery conduit means for connecting said source of fluid under pressure with said motors including a manual selecting value for supplying the fluid under pressure in certain conduits and distribution valve means for selectively supplying the fluid pressure in certain conduits to respective motors, and electrically operable means for activating said distribution valve means; the combination of first and second slip ratio computing means for generating an electric signal when the ratio of the revolving velocity of the output shaft of said torque converter to the revolving velocity of the input shaft of the same attains different predetermined values, a first and second revolving velocity detecting means for the output shaft of said engine for generating an electric signal when the revolving velocity of the output shaft of said engine attains a different revolving velocity, first and second revolving velocity detecting means for the output shaft of said gear unit for generating an electric signal respectively when the revolving velocity of the output shaft of said gear unit attains a different revolving velocity, gear position indicating means for generating an electric signal for indicating each position of the other gear ratio drives of said gear unit when one of said gear ratio drives is selected, a synchronous time retaining circuit for generating an electric signal when a predetermined time expires after said distribution valve means has been activated, a first logic product circuit for generating an electric signal when the electric signals generated (a) by said first slip ratio computing means, (b) said first revolving velocity detecting means for the output shaft of said engine, (c) said first revolving velocity detecting means for the output shaft of said gear unit, (d) said gear position indicating means and (e) said synchronous time retaining circuit are coexistent, a second logic product circuit for generating an electric signal when one of the electric signals generated (a) by said second slip ratio computing means, (b) said second revolving velocity detecting means for the output shaft of said engine or second revolving velocity detecting means for the output shaft of said gear unit, (c) said gear position indicating signal and by (d) said synchronous time retaining circuit are coexistent; whereby said electrically operable means for said distribution valve means activated in one direction by the generation of the electric signal by said first logic product circuit to carry out the gear ratio drive from lower gear state to the higher gear state is activated to its original state by the generation of the electric signal from said second logic product circuit to carry out the gear ratio drive from higher gear to the lower gear state.

2. In a variable speed automatic transmission for a vehicle, the combination according to claim 1 characterized in that a logic sum circuit is provided for generating an electric signal when one of the electric signals generated by (a) said second slip ratio computing means, (b) said second revolving velocity detecting means for the output shaft of said engine or said second revolving velocity detecting means for the output shaft of said gear unit is present; whereby said second logic product circuit generates an electric signal when the electric signals generated by said logic sum circuit, said gear position indicating means and said synchronous time retaining circuit are coexistent.

3. In a variable speed automatic transmission for a vehicle the combination according to claim 2 characterized in that a bistable memorial circuit generates an electric output signal when an input signal applied to its first input terminal and eliminating said electric output signal, when another input signal is given to its second input terminal, is provided by connecting its first input terminal to the output terminal of the first logic product circuit and connecting its second input terminals of the first logic product circuit and connecting its second input terminal to the output terminal of the second logic product circuit; whereby said electrically operable distribution valve means is activated in one direction from its position by the generation of the electric output signal from said bistable memorial circuit to change of the gear ratio drive from the lower gear state to the higher gear state and is directionally returned to its original position by the elimination of the electric output signal from said bistable memorial circuit, to effectuate the gear ratio drive from the higher gear state to the lower gear state.

4. In a variable speed automatic transmission for a vehicle having an engine, having an output shaft, a gear unit having an output shaft providing a plurality of different speed gear ratio drives, a hydraulic torque converter having an input and output interposed therebetween, friction engaging means including fluid-actuated motors which complete the respective gear ratio drives, a source of fluid under pressure, delivery conduit means for connecting said source of fluid pressure with said motors including a manual selecting valve for supplying the fluid under pressure in certain conduit means and a plurality of distribution valves for selectively supplying fluid under pressure to respective motor or motors and electrically operable means for respectively activating said distribution valves; the combination of a plurality of electronic computing circuits for generating an electric output signal for operating said distribution valves, a synchronous time retaining circuit for generating an electric signal when a predetermined time expires after said distribution valves being activated, gear ratio indicating means for generating an electric signal for indicating each gear position of the different gear ratio drives of said gear unit when one of said gear ratio drives is selected; each one of said electronic computing circuits being provided with first and second slip ratio computing means for generating an electric signal (a) when the ratio of the revolving velocity of the output shaft of said torque converter to the revolving velocity of the output shaft of said torque converter to the revolving velocity of the input shaft of the same reaches a predetermined value, (b) the first and second revolving velocity detecting means for the output shaft on said engine for generating an electric signal when the revolving velocity of the output shaft of said engine reaches to predetermined velocity, (c) a first and second revolving velocity detecting means for the output shaft of said gear unit for generating an electric signal when the revolving velocity of the output shaft of said gear unit attains a predetermined velocity; a first logic product circuit for generating an electric signal when the electric signals generated by (a) said first slip ratio computing means, (b) said first revolving velocity detecting means for the output shaft of said engine, (c) said first revolving velocity detecting means for the output shaft of said gear unit, (d) said gear position indicating means and (e) said synchronous time retaining circuit are coexistent; a second logic product circuit for generating an electric signal when one of the electric signals (a) generated by said second slip ratio computing means, (b) said second revolving velocity detecting means for the output shaft of said engine or second revolving velocity detecting means for the output shaft of said gear unit, (c) said gear position indicating means and (d) said synchronous time retaining circuit are coexistent; whereby said electrically operable means for said distribution valves are activated for displacement in one direction by the generation of the electric signal by said first logic product circuit and are activated to return to their original state by the generation of the electric signal by said second logic product circuit to complete the respective gear ratio drives.

5. In a variable speed automatic transmission for a vehicle, the combination according to claim 4 is further characterized in that there are provided a logic sum circuit among said logic computing circuits for generating an electric signal when one of the electric signals generated by (a) said second slip ratio computing means, and (b) said second revolving velocity detecting means for the output shaft of said engine or said second revolving velocity detecting means for the output shaft of said gear unit is applied; and a bistable memorial circuit among logic computing circuits which continues generating an electric signal when an electric output signal generated by said first logic product circuit is applied to its first input terminal and continues eliminating said electric output signal when an electric output signal generated by said second logic product circuit is applied to its second input terminal; whereby said electrically operable means respectively is activated in one direction by the generation of the electric output signal from said bistable memorial circuit and returned to its original state by the elimination of the electric output signal from said bistable memorial circuit.

* * * * *